(12) United States Patent
Papasakellariou

(10) Patent No.: US 12,376,087 B2
(45) Date of Patent: Jul. 29, 2025

(54) OVERHEAD REDUCTION AND RELIABILITY ENHANCEMENTS FOR DL CONTROL SIGNALING

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 17/653,851

(22) Filed: Mar. 7, 2022

(65) Prior Publication Data

US 2022/0191867 A1    Jun. 16, 2022

Related U.S. Application Data

(63) Continuation of application No. 16/452,238, filed on Jun. 25, 2019.
(Continued)

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC . H04W 72/0453; H04W 72/23; H04W 72/21; H04L 5/0041; H04L 5/0094; H04L 5/0055; H04L 5/0044; H04L 5/0053
See application file for complete search history.

(56) References Cited

U.S. PATENT DOCUMENTS

2011/0085458 A1    4/2011  Montojo et al.
2013/0176953 A1*   7/2013  Stern-Berkowitz ..........................
                                                    H04W 52/365
                                                    370/329
(Continued)

FOREIGN PATENT DOCUMENTS

EP       4114117 A1    1/2023
WO    2017076475 A1    5/2017

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.3.0, Sep. 2018, 237 pages.
(Continued)

*Primary Examiner* — Chuong M Nguyen

(57) ABSTRACT

Methods, user equipment (UE), and base stations for downlink control information (DCI) formats reception or transmission are provided. A method of operating a UE to transmit a physical uplink shared channel (PUSCH) includes receiving a configuration for a number of bits for a field that indicates a parameter in a first downlink control information (DCI) format; and receiving a physical downlink control channel (PDCCH) that provides either the first DCI format scheduling the PUSCH or a second DCI format scheduling the PUSCH. The second DCI format includes a field with a predetermined number of bits that indicates the parameter. A minimum number of bits for the field in the first DCI format is smaller than the predetermined number of bits for the field in the second DCI format. The method also includes transmitting the PUSCH.

20 Claims, 18 Drawing Sheets

Related U.S. Application Data

(60) Provisional application No. 62/732,186, filed on Sep. 17, 2018, provisional application No. 62/695,557, filed on Jul. 9, 2018.

(56) References Cited

U.S. PATENT DOCUMENTS

| | | |
|---|---|---|
| 2013/0195041 A1 | 8/2013 | Papasakellariou et al. |
| 2014/0086137 A1 | 3/2014 | Chen |
| 2015/0063231 A1 | 3/2015 | Seo et al. |
| 2015/0201388 A1* | 7/2015 | Cheng .................. H04W 52/14 370/329 |
| 2015/0333889 A1 | 11/2015 | Earnshaw et al. |
| 2016/0029239 A1* | 1/2016 | Sadeghi .............. H04W 52/244 370/252 |
| 2016/0100382 A1 | 4/2016 | He et al. |
| 2016/0100422 A1 | 4/2016 | Papasakellariou et al. |
| 2016/0294593 A1 | 10/2016 | Yi et al. |
| 2017/0064639 A1* | 3/2017 | Yang ................ H04W 72/0453 |
| 2017/0105198 A1 | 4/2017 | Fu et al. |
| 2017/0188311 A1* | 6/2017 | Hwang ................. H04W 52/34 |
| 2017/0223694 A1* | 8/2017 | Han ...................... H04W 16/32 |
| 2017/0303251 A1 | 10/2017 | Ko et al. |
| 2018/0074951 A1 | 3/2018 | Feigin et al. |
| 2018/0279325 A1 | 9/2018 | Huang et al. |
| 2019/0132109 A1 | 5/2019 | Zhou et al. |
| 2019/0153274 A1 | 5/2019 | Markesinis et al. |
| 2019/0199477 A1* | 6/2019 | Park .......................... H04L 5/00 |
| 2019/0215807 A1 | 7/2019 | Hwang et al. |
| 2019/0222404 A1 | 7/2019 | Ang et al. |
| 2019/0246378 A1 | 8/2019 | Islam et al. |
| 2019/0254009 A1 | 8/2019 | Hwang et al. |
| 2019/0297607 A1 | 9/2019 | Kim et al. |
| 2019/0349147 A1 | 11/2019 | Aiba et al. |
| 2019/0373588 A1 | 12/2019 | Bae et al. |
| 2019/0386718 A1 | 12/2019 | Sengupta et al. |
| 2019/0387501 A1 | 12/2019 | Park et al. |
| 2020/0037314 A1* | 1/2020 | Xiong ................... H04L 1/1812 |
| 2020/0221428 A1 | 7/2020 | Moon et al. |
| 2020/0235894 A1 | 7/2020 | Takeda et al. |
| 2020/0267698 A1 | 8/2020 | Xing et al. |
| 2020/0267706 A1 | 8/2020 | Babaei et al. |
| 2020/0274637 A1* | 8/2020 | Li .......................... H04L 5/0053 |
| 2020/0296758 A1 | 9/2020 | Li et al. |
| 2021/0160917 A1 | 5/2021 | Goto et al. |
| 2021/0266909 A1 | 8/2021 | Lin et al. |
| 2021/0274536 A1 | 9/2021 | Shin et al. |

OTHER PUBLICATIONS

"3rd Generation Partnership Project; Technical Specification Group Radio Access Network; Evolved Universal Terrestrial Radio Access (E-UTRA); Multiplexing and channel coding(Release 15)", 3GPP TS 36.212 V15.3.0, Sep. 2018, 247 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.3.0, Sep. 2018, 546 pages.

"3rd Generation Partnership Project;Technical Specification Group Radio Access Network; Evolved Universal Terrestrial Radio Access (E-UTRA); Physical layer;Measurements(Release 15)", 3GPP TS 36.214 V15.3.0, Sep. 2018, 25 pages.

"3rd Generation Partnership Project;Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, 127 pages.

"LTE; Evolved Universal Terrestrial Radio Access (E-UTRA); Radio Resource Control (RRC); Protocol specification (3GPP TS 36.331 version 15.3.0 Release 15)," ETSI TS 136 331, Oct. 2018, 916 pages.

ISA/KR, International Search Report and Written Opinion of the International Searching Authority, International Application No. PCT/KR2019/008403, Oct. 16, 2019, 8 pages.

Intel Corporation, "On compact DCI format for NR URLLC," R1-1804740, 3GPP TSG RAN WG1 Meeting #92bis, Sanya, China, Apr. 16-20, 2018, 7 pages.

European Patent Office, "Supplementary European Search Report" issued Aug. 25, 2021, in connection with counterpart European Patent Application No. 19833069.8, 12 pages.

Vivo, "DCI contents and formats", 3GPP TSG RAN WG1 NR Meeting AH 1801, R1-1800198, Vancouver, Canada, Jan. 22-26, 2018, 8 pages.

Mediatek Inc., "Analysis of Compact DCI", 3GPP TSG RAN WG1 Meeting #92, R1-1801675, Athens, Greece, Feb. 26-Mar. 2, 2018, 3 pages.

Extended European Search Report issued Feb. 14, 2025 regarding Application No. 24209737.6, 15 pages.

Huawei, "Email discussion [86b-23] on multi-steps DL control channel design", 3GPP TSG RAN WG1 Meeting #87, R1-1611656, Nov. 2016, 14 pages.

* cited by examiner

OVERHEAD REDUCTION AND RELIABILITY ENHANCEMENTS FOR DL CONTROL SIGNALING

CROSS-REFERENCE TO RELATED APPLICATIONS AND CLAIM OF PRIORITY

This application is a continuation of U.S. patent application Ser. No. 16/452,238, filed on Jun. 25, 2019, which claims priority to U.S. Provisional Patent Application No. 62/695,557, filed on Jul. 9, 2018; and U.S. Provisional Patent Application No. 62/732,186, filed on Sep. 17, 2018. The content of the above-identified patent document is incorporated herein by reference.

TECHNICAL FIELD

The present application relates generally to wireless communication systems, more specifically, this disclosure relates to overhead reduction and reliability enhancement for DL control signaling.

BACKGROUND

The present disclosure relates to a pre-5$^{th}$-generation (5G) or 5G communication system to be provided for supporting higher data rates beyond 4$^{th}$-generation (4G) communication system such as long-term evolution (LTE). The present disclosure relates to supporting a dynamic number of repetitions of a PDCCH reception by a user equipment (UE) in a time domain and to enabling the UE to determine the number of repetitions. The present disclosure also relates reducing a number of non-overlapping control channel elements (CCEs) that a UE needs to perform channel estimation in order for the UE to decode a downlink control information (DCI) format in a physical downlink control channel (PDCCH) received with a dynamic number of repetitions for a CCE aggregation level. The present disclosure additionally relates to dimensioning fields of a DCI format, and therefore dimensioning a DCI format size, according to characteristics of an associated service type or of a channel medium for the communication. The present disclosure further relates to enabling a dynamically scheduled PDSCH reception by a UE without an associated DCI format. The present disclosure also relates to enabling broadcast transmission of a transport block by a base station (gNB) to multiple UEs and reception by the gNB of corresponding hybrid automatic repeat request acknowledgment (HARQ-ACK) information in a PUCCH from each UE of the multiple UEs. The present disclosure additionally relates to scheduling PDSCH receptions by or PUSCH transmissions from a group of UEs with a single DCI format.

SUMMARY

The present disclosure relates to a pre-5G or 5G communication system to be provided for supporting higher data rates beyond 4G communication system such as LTE. Embodiments of the present disclosure provide transmission structures and format in advanced communication systems.

In one embodiment, a method for a UE to transmit a physical uplink shared channel (PUSCH) is provided. The method comprises receiving a configuration for a number of bits for a field that indicates a parameter in a first DCI format, and a PDCCH that provides either the first DCI format scheduling the PUSCH or a second DCI format scheduling the PUSCH. The second DCI format includes a field with a predetermined number of bits that indicates the parameter. A minimum number of bits for the field in the first DCI format is smaller than the predetermined number of bits for the field in the second DCI format. The method also comprises transmitting the PUSCH.

In another embodiment, a UE is provided. The UE comprises a receiver and a transmitter. The receiver is configured to receive a configuration for a number of bits for a field that indicates a parameter in a first DCI format; and receive a PDCCH that provides either the first DCI format scheduling the PUSCH or a second DCI format scheduling the PUSCH. The second DCI format includes a field with a predetermined number of bits that indicates the parameter. A minimum number of bits for the field in the first DCI format is smaller than the predetermined number of bits for the field in the second DCI format. The transmitter is configured to transmit the PUSCH.

In yet another embodiment, a base station is provided. The base station comprises a transmitter and a receiver. The transmitter is configured to transmit a configuration for a number of bits for a field that indicates a parameter in a first DCI format; and transmit a PDCCH that provides either the first DCI format scheduling the PUSCH or a second DCI format scheduling the PUSCH. The second DCI format includes a field with a predetermined number of bits that indicates the parameter. A minimum number of bits for the field in the first DCI format is smaller than the predetermined number of bits for the field in the second DCI format. The receiver is configured to receive the PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v15.3.0, "NR; Physical channels and modulation;" 3GPP TS 36.212 v15.3.0, "NR; Multiplexing and Channel coding;" 3GPP TS 36.213 v15.3.0, "NR; Physical Layer Procedures for Control;" 3GPP TS 36.214 v15.3.0, "NR; Physical Layer Procedures for Data;" 3GPP TS 36.321 v15.3.0, "NR; Medium Access Control (MAC) protocol specification;" and 3GPP TS 36.331 v15.3.0, "NR; Radio Resource Control (RRC) Protocol Specification."

Figure 1:
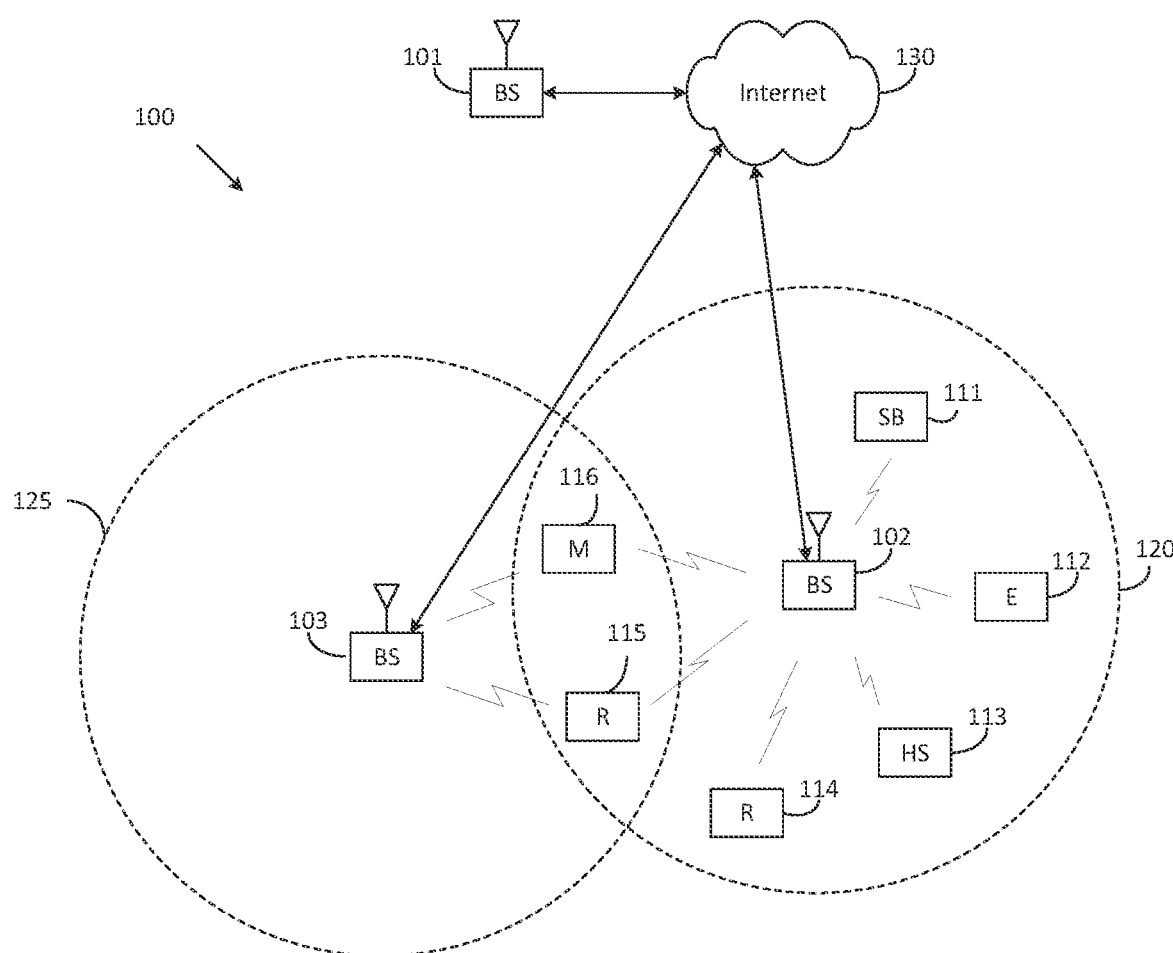
FIG. 1 illustrates an example wireless network according to embodiments of the present disclosure.
Figure 2:
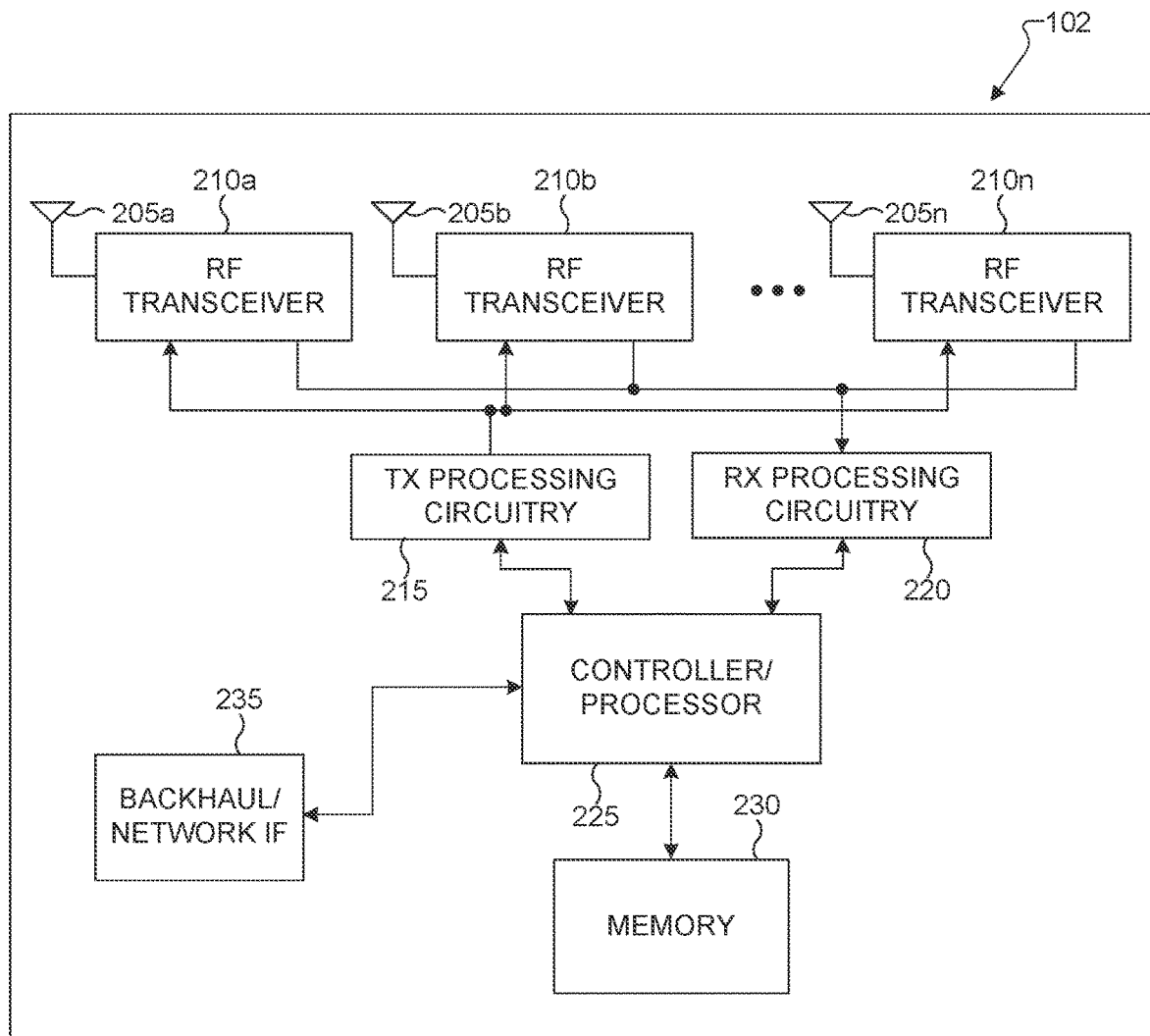
FIG. 2 illustrates an example gNB according to embodiments of the present disclosure.
Figure 3:
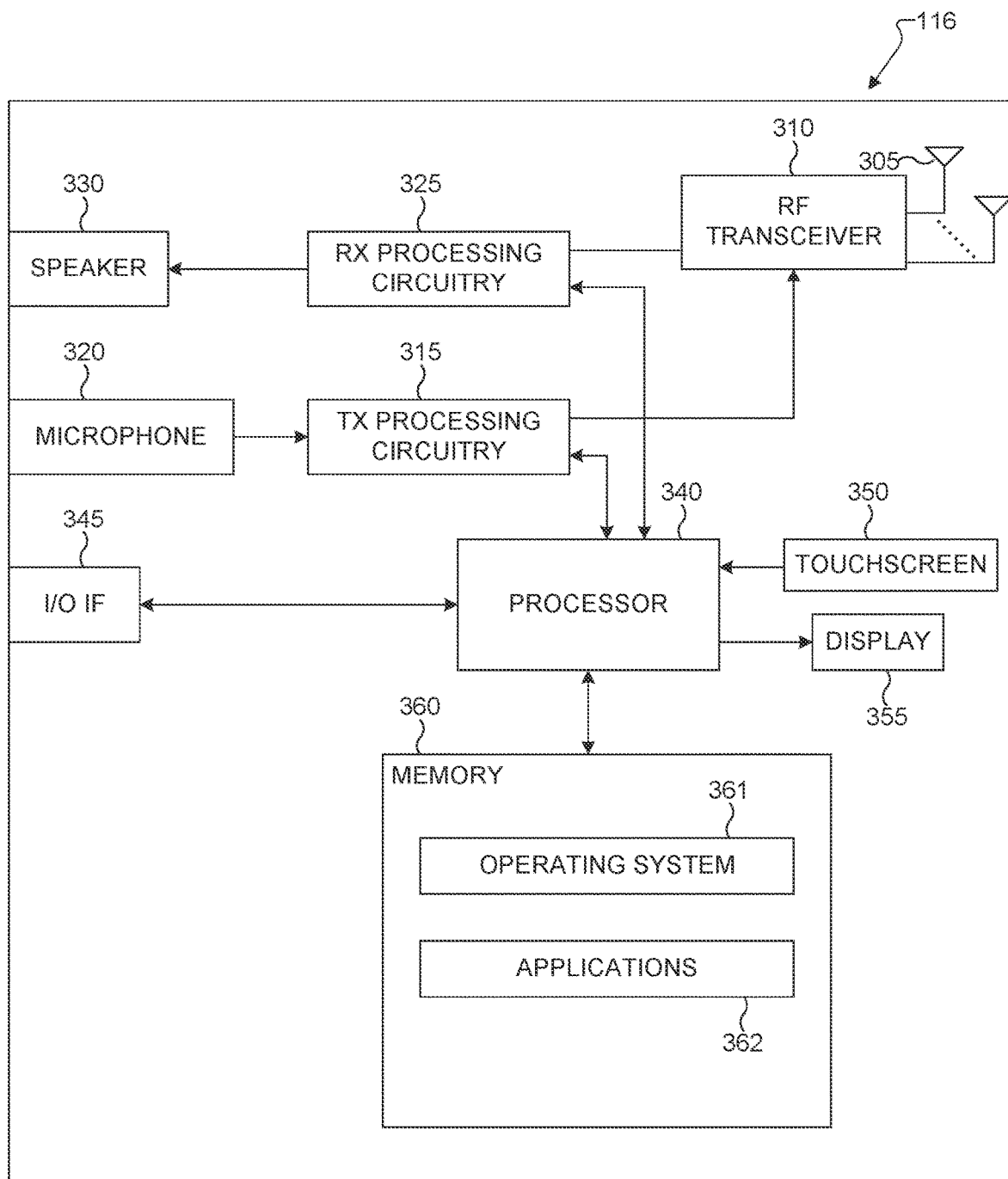
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a Wi-Fi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, Wi-Fi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a Wi-Fi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient reception reliability for data and control information in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to improving a PDCCH reception reliability and reducing an associated signaling overhead. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 7 symbols or 14 symbols, respectively, and an RB can have a BW of 180 kHz or 360 kHz and include 12 SCs with inter-SC spacing of 15 kHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

Figure 4:
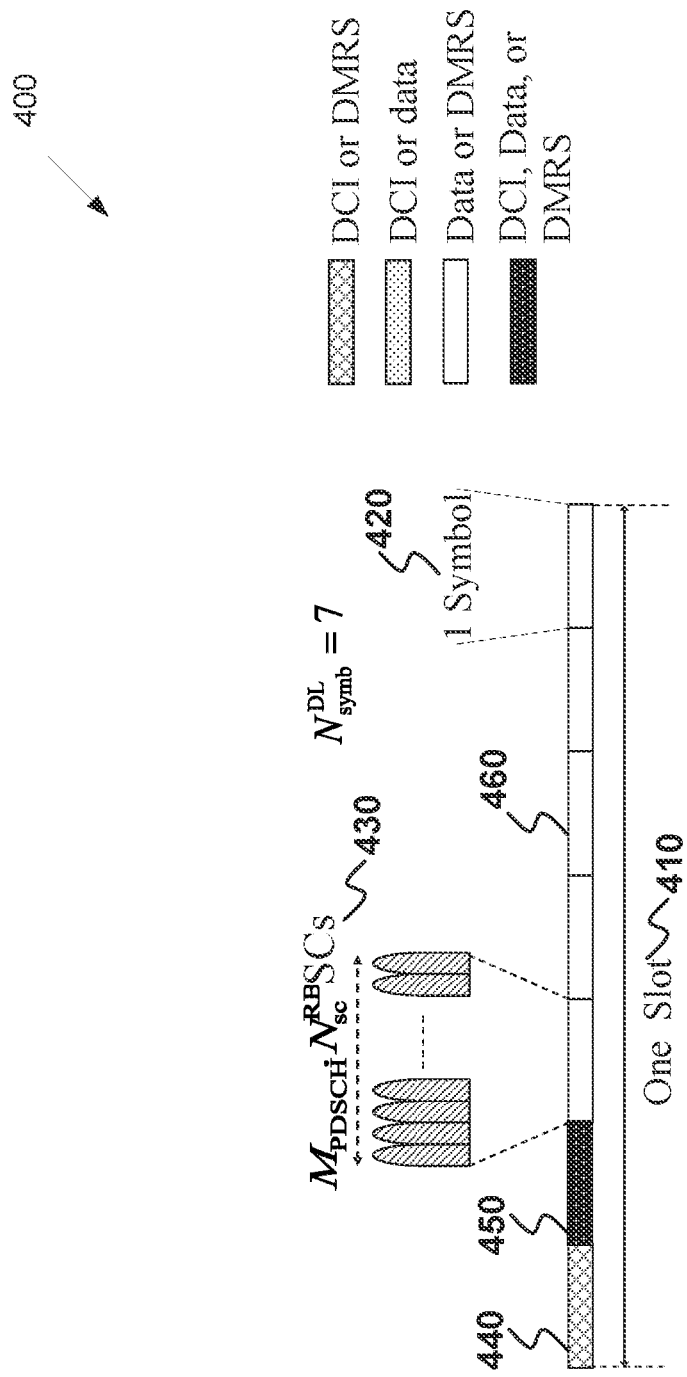
FIG. 4 illustrates an example DL slot structure for PDSCH transmission or PDCCH transmission according to embodiments of the present disclosure.

FIG. 4 illustrates an example DL slot structure 400 for PDSCH transmission or PDCCH transmission according to embodiments of the present disclosure. An embodiment of the DL slot structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

A slot 410 includes $N_{symb}^{DL}=7$ symbols 420 where a gNB transmits data information, DCI, or DMRS. A DL system BW includes $N_{RB}^{DL}$ RBs. Each RB includes $N_{sc}^{RB}$ SCs. For example, $N_{sc}^{RB}=12$. A UE is assigned $M_{PDSCH}$ RBs for a total of $M_{sc}^{PDSCH}=M_{PDSCH} \cdot N_{sc}^{RB}$ SCs 430 for a PDSCH transmission BW. A PDCCH conveying DCI is transmitted over control channel elements (CCEs) that are substantially spread across the DL system BW used for PDCCH transmissions. For example, a first slot symbol 440 can be used by the gNB to transmit DCI and DMRS. A second slot symbol 450 can be used by the gNB to transmit DCI or data or DMRS. Remaining slot symbols 460 can be used by the gNB to transmit PDSCH, DMRS associated with each PDSCH, and CSI-RS. In some slots, the gNB can also transmit synchronization signals and system information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgment (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

Figure 5:
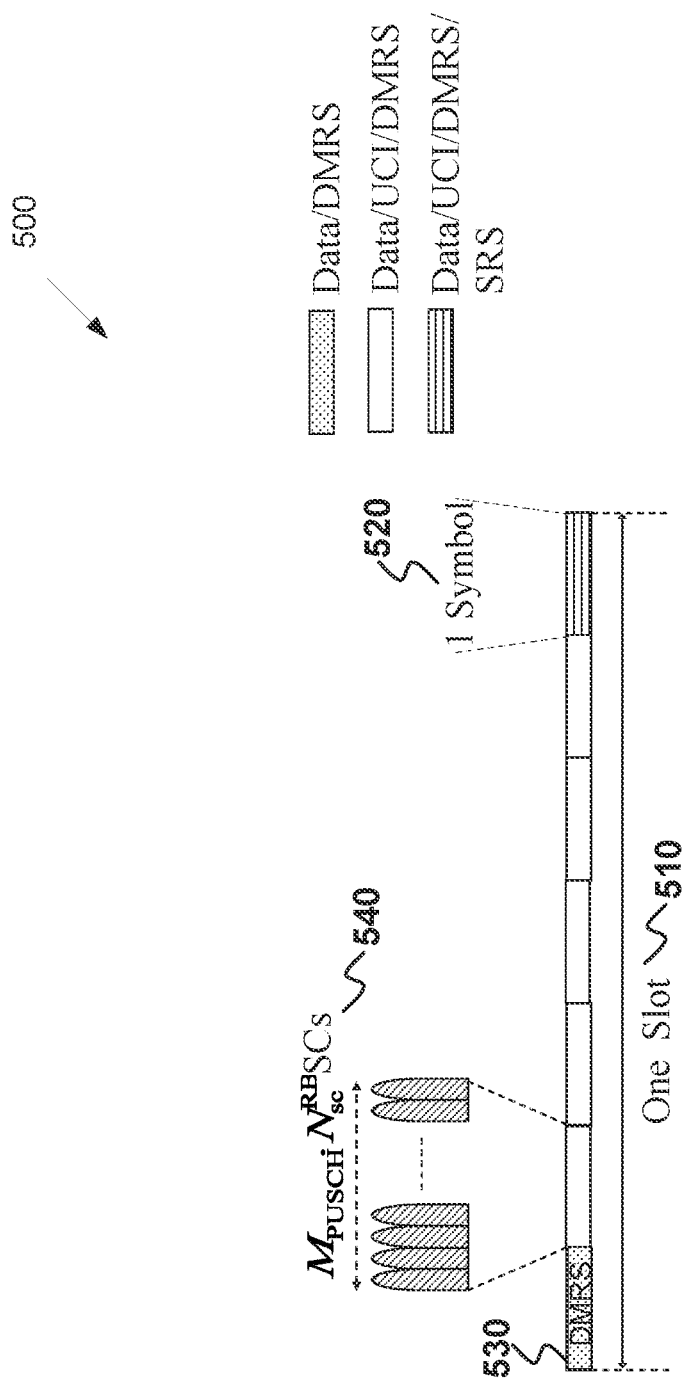
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. An embodiment of the UL slot structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A slot 510 includes $N_{symb}^{UL}=7$ symbols 520 where UE transmits data information, UCI, or RS including one symbol where the UE transmits DMRS 530. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH} \cdot N_{sc}^{RB}$ SCs 540 for a PUSCH transmission BW ("X"="S") or for a PUCCH transmission BW ("X"="C"). A last one or more slot symbols can be used to multiplex PUCCH transmissions or SRS transmissions from one or more UEs.

A hybrid slot includes symbols for DL transmissions, one or more symbols for a guard period (GP), and symbols for UL transmissions, similar to a special SF. For example, symbols for DL transmissions can convey PDCCH and PDSCH transmissions and symbols for UL transmissions can convey PUCCH transmissions. For example, symbols for DL transmissions can convey PDCCH transmissions and symbols for an UL transmission can convey PUSCH and PUCCH transmissions.

Figure 6:
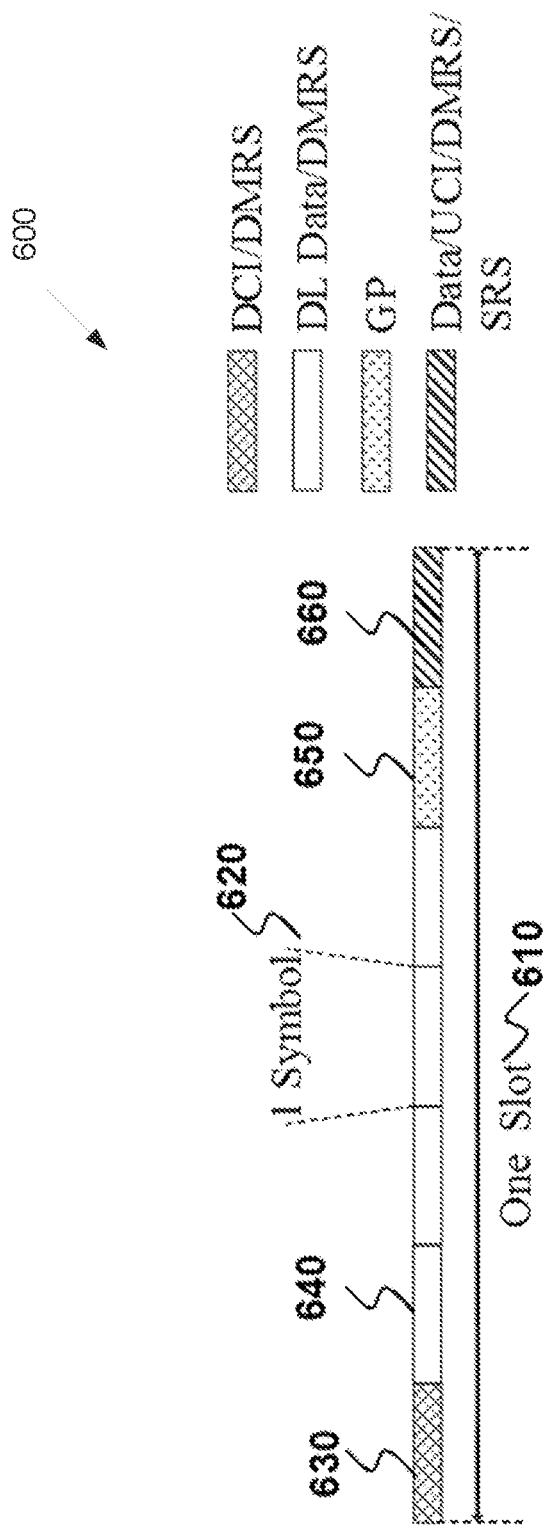
FIG. 6 illustrates an example hybrid slot structure for DL transmissions and UL transmissions according to embodiments of the present disclosure.

FIG. 6 illustrates an example hybrid slot structure 600 for DL transmissions and UL transmissions according to embodiments of the present disclosure. An embodiment of the hybrid slot structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A slot 610 consists of a number of symbols 620 that include a symbol for DCI transmissions and DMRS in respective PDCCHs 630, four symbols for data transmissions in respective PDSCHs 640, a GP symbol 650 to provide a guard time for the UE to switch from DL reception to UL transmission, and an UL symbol for transmitting UCI on a PUCCH 660. In general, any partitioning between DL symbols and UL symbols of a hybrid slot is possible by sliding the location of the GP symbol from the second symbol of a slot to the second to last symbol of a slot. The GP can also be shorter than one slot symbol and the additional time duration can be used for DL transmissions or for UL transmissions with shorter symbol duration. GP symbols do not need to be explicitly included in a slot structure and can be provided in practice from the gNB scheduler by not scheduling transmissions to UEs or transmissions from UEs in such symbols.

DL transmissions and UL transmissions can be based on an orthogonal frequency division multiplexing (OFDM) waveform including a variant using DFT preceding that is known as DFT-spread-OFDM.

Figure 7:
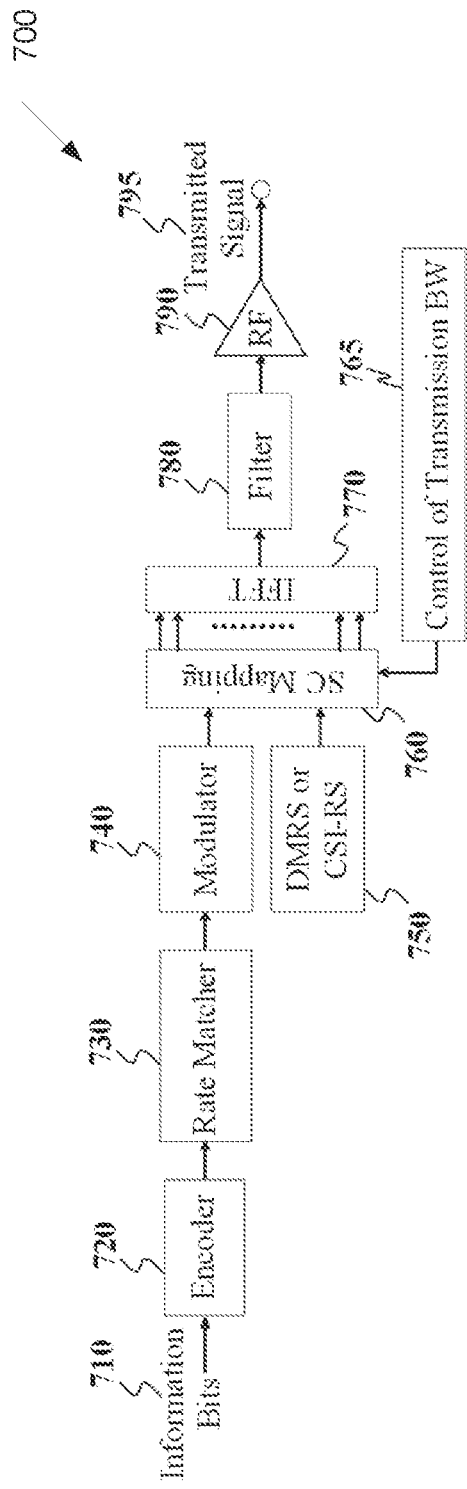
FIG. 7 illustrates an example transmitter structure using OFDM according to embodiments of the present disclosure.

FIG. 7 illustrates an example transmitter structure 700 using OFDM according to embodiments of the present disclosure. An embodiment of the transmitter structure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 710, are encoded by encoder 720, rate matched to assigned time/frequency resources by rate matcher 730 and modulated by modulator 740. Subsequently, modulated encoded symbols and DMRS or CSI-RS 750 are mapped to SCs 760 by SC mapping unit 765, an inverse fast Fourier transform (IFFT) is performed by filter 770, a cyclic prefix (CP) is added by CP insertion unit 780, and a resulting signal is filtered by filter 790 and transmitted by an radio frequency (RF) unit 795.

Figure 8:
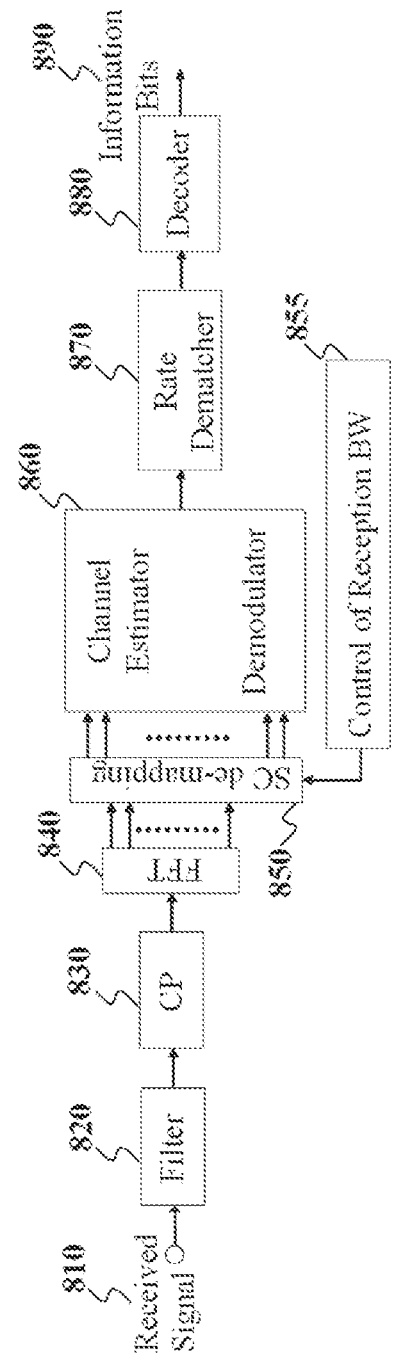
FIG. 8 illustrates an example receiver structure using OFDM according to embodiments of the present disclosure.

FIG. 8 illustrates an example receiver structure 800 using OFDM according to embodiments of the present disclosure. An embodiment of the receiver structure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 810 is filtered by filter 820, a CP removal unit removes a CP 830, a filter 840 applies a fast Fourier transform (FFT), SCs de-mapping unit 850 de-maps SCs selected by BW selector unit 855, received symbols are demodulated by a channel estimator and a demodulator unit 860, a rate de-matcher 870 restores a rate matching, and a decoder 880 decodes the resulting bits to provide information bits 890.

A UE typically monitors multiple candidate locations for respective potential PDCCH transmissions to decode multiple candidate DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to UE establishing RRC connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI that is configured to the UE by UE-specific RRC signaling, and a common search space (CSS) for PDCCH candidates with DCI formats having CRC scrambled by other RNTI. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 9:
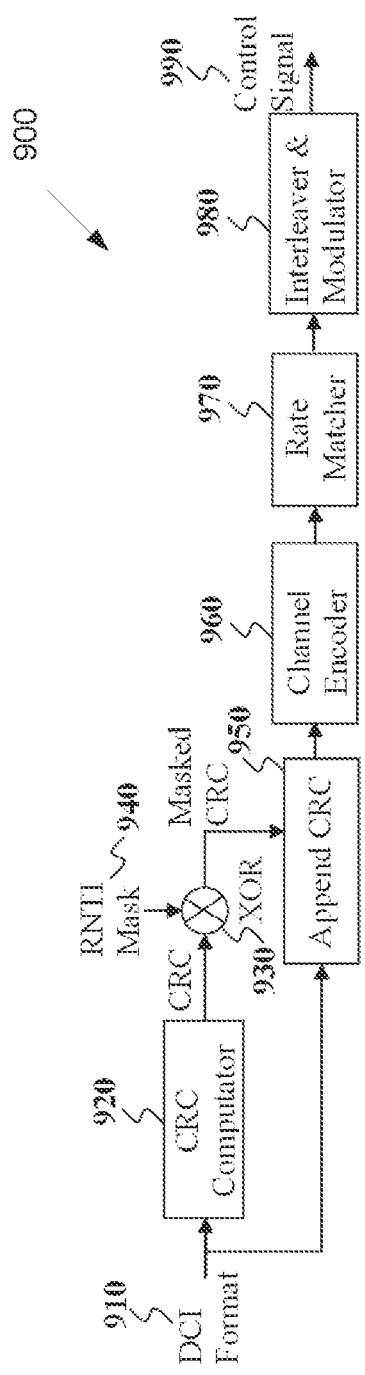
FIG. 9 illustrates an example encoding process for a DCI format according to embodiments of the present disclosure.

FIG. 9 illustrates an example encoding process 900 for a DCI format according to embodiments of the present disclosure. An embodiment of the encoding process 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 910 is determined using a CRC computation unit 920, and the CRC is masked using an exclusive OR (XOR) operation unit 930 between CRC bits and RNTI bits 940. The XOR operation is defined as XOR(0,0)=0, XOR(0,1)=1, XOR(1,0)=1, XOR(1,1)=0. The masked CRC bits are appended to DCI format information bits using a CRC append unit 950. An encoder 960 performs channel coding (such as tail-biting convolutional coding or polar coding), followed by rate matching to allocated resources by rate matcher 970. Interleaving and modulation units 980 apply interleaving and modulation, such as QPSK, and the output control signal 990 is transmitted.

Figure 10:
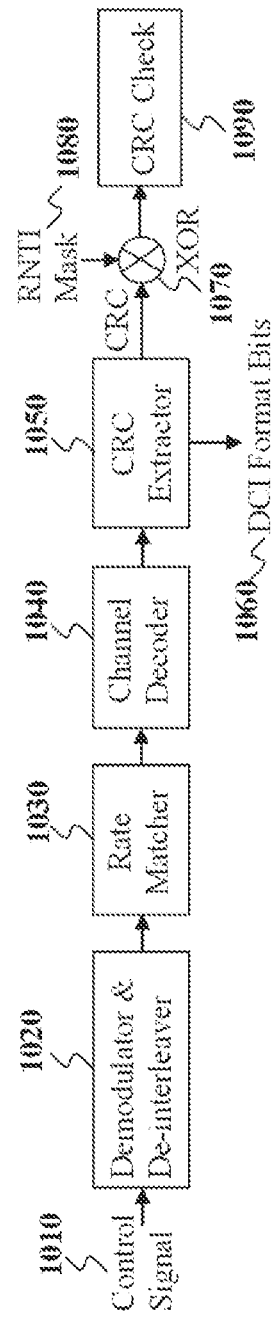
FIG. 10 illustrates an example decoding process for a DCI format for use with a UE according to embodiments of the present disclosure.

FIG. 10 illustrates an example decoding process 1000 for a DCI format for use with a UE according to embodiments of the present disclosure. An embodiment of the decoding process 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received control signal 1010 is demodulated and de-interleaved by a demodulator and a de-interleaver 1020. A rate matching applied at a gNB transmitter is restored by rate matcher 1030, and resulting bits are decoded by decoder 1040. After decoding, a CRC extractor 1050 extracts CRC bits and provides DCI format information bits 1060. The DCI format information bits are de-masked 1070 by an XOR operation with an RNTI 1080 (when applicable) and a CRC check is performed by unit 1090. When the CRC check succeeds (check-sum is zero), the DCI format information bits are considered to be valid. When the CRC check does not succeed, the DCI format information bits are considered to be invalid.

For each DL BWP configured to a UE in a serving cell, a UE can be provided by higher layer signaling a number of control resource sets. For each control resource set, the UE is provided: a control resource set index p; a DM-RS scrambling sequence initialization value; a precoder granularity for a number of REGs in frequency where the UE can assume use of a same DM-RS precoder; a number of consecutive symbols; a set of resource blocks; CCE-to-REG mapping parameters; an antenna port quasi co-location, from a set of antenna port quasi co-locations, indicating quasi co-location information of the DM-RS antenna port for PDCCH reception; and an indication for a presence or absence of a transmission configuration indication (TCI) field for DCI format 1_1 transmitted by a PDCCH in control resource set p.

For each DL BWP configured to a UE in a serving cell, the UE is provided by higher layers with a number of search space sets where, for each search space set from the number search space sets, the UE is provided the following: a search space set index s; an association between the search space set s and a control resource set p; a PDCCH monitoring periodicity of $k_{p,s}$ slots and a PDCCH monitoring offset of $o_{p,s}$ slots; a PDCCH monitoring pattern within a slot, indicating first symbol(s) of the control resource set within a slot for PDCCH monitoring; a number of PDCCH candidates $M_{p,s}^{(L)}$ per CCE aggregation level L; and an indication that search space set s is either a common search space set or a UE-specific search space set.

For a search space set s associated with control resource set p, the CCE indexes for aggregation level L corresponding to PDCCH candidate $m_{s,n_{CI}}$ of the search space set in slot $n_{s,f}^{\mu}$ for a serving cell corresponding to carrier indicator field value $n_{CI}$ (also referred to as search space) are given as in Equation 1:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i \quad \text{Equation 1}$$

In Equation 1, for any common search space, $Y_{p,n_{s,f}^{\mu}}=0$; for a UE-specific search space, $Y_{p,n_{s,f}^{\mu}}=(A_p \cdot Y_{p,n_{s,f}^{\mu}-1}) \bmod D$, $Y_{p,-1}=n_{RNTI} \neq 0$, $A_0=39827$ for p mod 3=0, $A_1=39829$ for p mod 3=1, $A_2=39839$ for p mod 3=2, and D=65537; i=0, . . . , L−1; $N_{CCE,p}$ is the number of CCEs, numbered from 0 to $N_{CCE,p}-1$, in control resource set p; $n_{CI}$ is the carrier indicator field value if the UE is configured with a carrier indicator field; otherwise, including for any common search space, $n_{CI}=0$; $m_{s,n_{CI}}=0, \ldots, M_{p,s,n_{CI}}^{(L)}-1$, where $M_{p,s,n_{CI}}^{(L)}$ is the number of PDCCH candidates the UE is configured to monitor for aggregation level L for a serving cell corresponding to $n_{CI}$ and a search space set s; for any common search space, $M_{p,s,max}^{(L)}=M_{p,s,0}^{(L)}$; for a UE-specific search space, $M_{p,s,max}^{(L)}$ is the maximum of $M_{p,s,n_{CI}}^{(L)}$ across all configured $n_{CI}$ values for a CCE aggregation level L of search space set s in control resource set p; and the RNTI value used for $n_{RNTI}$.

One important characteristic of so-called 5G systems is an ability to support multiple service types requiring block error rate (BLER) targets for data or control information that are different by orders of magnitude and requiring widely different latencies for a successful delivery of a transport block.

Enabling reception of transport block with low BLER, such as 0.001% or less, and low latency is an exceedingly difficult task for a network and can require substantial resources. When a transport block transmission in a PDSCH or PUSCH is scheduled by a DCI format included in a PDCCH reception, the transport block BLER target depends on both the DCI format BLER and the transport block BLER. The DCI format BLER is a function of a DCI format code rate and of the received signal to interference and noise ratio (SINR).

Achieving a BLER for a DCI format detection in the range of 0.001% or less requires a small code rate and a large SINR even for UEs experiencing favorable channel conditions. A small code rate is achieved by reducing the DCI format size and transmitting a corresponding PDCCH over a large number of resources. This implies that a small DCI format size and large CCE aggregation levels are beneficial towards achieving a BLER of 0.001% or less. While this can be adequate for a large percentage of UEs in a cell, UEs that experience low SINRs require repetitions of a PDCCH reception for a DCI format in order to increase an effective SINR by combining the repetitions of the PDCCH reception prior to decoding the DCI format.

Repetitions of a PDCCH reception can be in a frequency domain across control resource sets, effectively resulting to a larger CCE aggregation level where CCEs are split in different control resource sets, or in time domain where a transmission power can apply over multiple symbols of a slot.

A number of repetitions in time for a PDCCH reception by a UE can be dynamic to reflect a dynamic available power at a gNB transmitter, depending on an existence of other simultaneous transmissions, and dynamic channel conditions that can be experienced by the UE. Then, in order for a UE to determine a start of a PDSCH reception or a PUSCH transmission that is scheduled by a DCI format in the PDCCH reception, or in order for the UE to perform rate matching for the PDSCH reception, the UE needs to be capable of determining a PDCCH monitoring occasion for a first repetition of the PDCCH reception and a corresponding number of repetitions.

From a DCI format decoding perspective, a repetition of a PDCCH reception is equivalent to receiving a PDCCH with a CCE aggregation level equal to a CCE aggregation level of a PDCCH reception in one PDCCH monitoring occasion times a number of repetitions. Therefore, for the purpose of DCI format decoding, a number of PDCCH candidates for a CCE aggregation level that are received with a number of repetitions require separate decoding and contribute to a total number of PDCCH candidates a UE can monitor during a time period such as a slot, $M_{PDCCH}^{max,slot,\mu}$, for a numerology (subcarrier spacing) configuration $\mu$.

In addition to $M_{PDCCH}^{max,slot,\mu}$, a number of distinct CCEs, referred to as non-overlapping CCEs, that a UE is capable of performing channel estimation is limited by a maximum of $C_{PDCCH}^{max,slot,\mu}$ and this constraint is typically met before the constraint on the maximum number of decoding operations for DCI formats particularly when a UE needs to perform decoding operations for multiple DCI formats within a slot.

Although with sufficiently large CCE aggregation level and number of repetitions for a DCI format reception, assisted by a reduction in DCI format size, a DCI format BLER of 0.001% or less can be achieved for a UE, this is an exceedingly difficult objective to simultaneously achieve for multiple UEs due to limitations in transmission power from a gNB and in time-frequency resources on a corresponding active DL bandwidth part (BWP) of a cell.

A PDSCH reception or a PUSCH transmission for a transport block that requires small BLER, such as 0.001% or less, needs to be robust while a corresponding transport block size is small. Moreover, in several applications, a transport block is common for multiple UEs but it is important for a gNB to know whether or not a UE correctly decoded the transport block in order to the gNB to determine potential retransmission of the transport block or to adapt parameters for a transmission of a next transport block.

Therefore, there is a need to support a dynamic number of repetitions of a PDCCH reception by a UE in a time domain and enable the UE to determine the number of repetitions.

There is another need to reduce a number of non-overlapping CCEs that a UE needs to perform channel estimation in order for the UE to decode a DCI format in a PDCCH received with a dynamic number of repetitions for a CCE aggregation level.

There is yet another need to dimension fields of a DCI format, and therefore dimension a DCI format size, according to characteristics of an associated service type or of a channel medium for the communication.

There is yet another need to enable a PDSCH reception by a UE without an associated DCI format.

There is yet another need to enable broadcast transmission of a transport block to multiple UEs and reception by the gNB of corresponding HARQ-ACK information in a PUCCH from each UE of the multiple UEs.

Finally, there is a need to schedule PDSCH receptions by or PUSCH transmissions from a group of UEs with a single DCI format.

In the following, one repetition for a PDCCH reception refers to a single PDCCH reception in one PDCCH monitoring occasion while a number (larger than one) of repetitions for a PDCCH reception refers to a PDCCH received in a same number of PDCCH monitoring occasions. Unless otherwise explicitly noted, repetitions of a PDCCH reception are assumed to occur in the time domain. PDCCH monitoring by a UE means that the UE performs a decoding operation for a presumed DCI format provided by a PDCCH candidate.

PDCCH Repetitions.

A UE can be configured a set of numbers of repetitions for a PDCCH reception, such as {1, 2, 4, 8} PDCCH repetitions, and a PDCCH reception can be with a number of repetitions from the set of numbers of repetitions. Repetitions for a PDCCH reception can be restricted to occur only for the larger CCE aggregation levels, such as the ones with 4, 8, or 16 CCEs, and need not be supported for the lowest aggregation levels, such as 1 or 2 CCEs, as a PDCCH repetition can then be supported by using a higher CCE aggregation level.

Supporting repetitions for large CCE aggregation levels that are smaller than the maximum one, for example supporting repetitions of a PDCCH reception with aggregation level of 8 CCEs when a maximum aggregation level is 16 CCEs, can be beneficial in trading off additional repetitions in order to avoid a PDCCH reception occupying substantially all CCEs in a control resource set, thereby avoiding blocking of PDCCH receptions by one or more other UEs at a PDCCH monitoring occasion in the control resource set.

For example, when a control resource set includes 16 CCEs and a PDCCH reception with aggregation level of 8 CCEs requires two repetitions, it can be preferable to receive the PDCCH twice with 8 CCEs and allow remaining 8 CCEs to be used for PDCCH receptions by other UEs in a PDCCH monitoring occasion than to have a single repetition for the PDCCH reception using all 16 CCEs of the control resource set.

A UE monitors a PDCCH candidate for each of the configured CCE aggregation levels and number of repetitions. A first repetition for a PDCCH reception can start at any PDCCH monitoring occasion or only at predetermined PDCCH monitoring occasions. A PDCCH candidate can be defined by a two-dimensional mapping to CCEs in (a) one PDCCH monitoring occasion and (b) in multiple PDCCH monitoring occasions according to a number of repetitions for the transmission of the PDCCH candidate.

For example, when repetitions of a PDCCH reception can start at any PDCCH monitoring occasion and for a UE configured to monitor 4 PDCCH candidates with an aggregation level of 8 CCEs and with {1, 2} repetitions at a reference PDCCH monitoring occasion (except the initial one), 2 PDCCH candidates with aggregation level of 8 CCEs can be with one repetition and 2 PDCCH candidates with aggregation level of 8 CCEs can be with two repetitions.

The CCEs for each of the two PDCCH candidates with one repetition are determined according to Equation 1 for a current PDCCH monitoring occasion. The CCEs for the two PDCCH candidates with two repetitions are determined according to Equation 1 for (a) the current PDCCH monitoring occasion for the second repetition and the immediately previous PDCCH monitoring occasion for the first repetition for a first of the two candidates and (b) the current PDCCH monitoring occasion for the first repetition and the immediately next PDCCH monitoring occasion for the second repetition for a second of the two candidates.

When repetitions of a PDCCH reception can start only at predetermined PDCCH monitoring occasions, only either the first or the second of the two PDCCH candidates with two repetitions exist.

Figure 11:
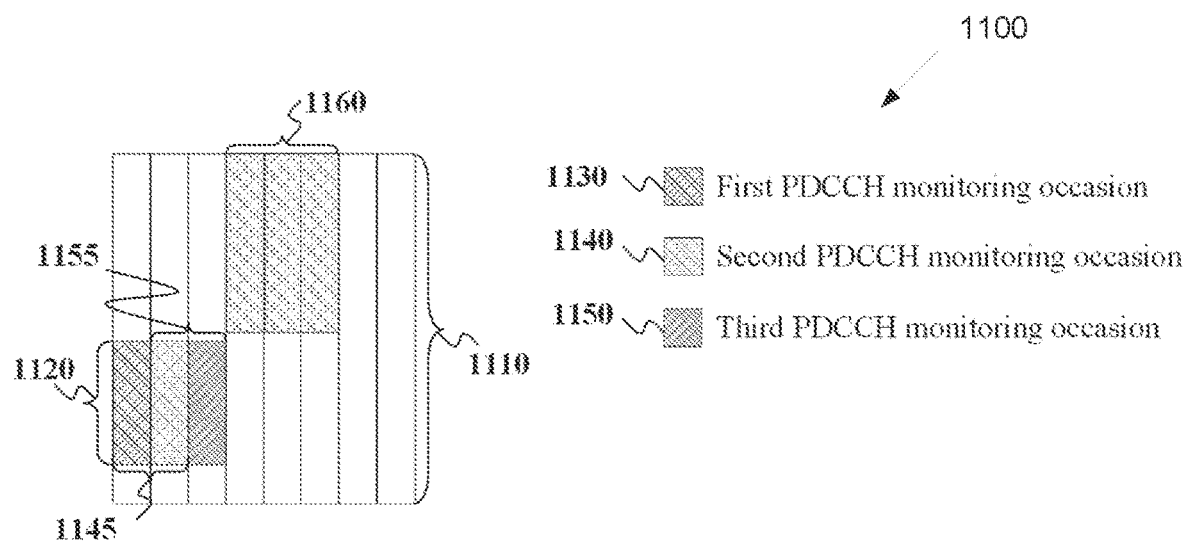
FIG. 11 illustrates an example repetition for a PDCCH reception starting at any PDCCH monitoring occasion according to embodiments of the present disclosure.

FIG. 11 illustrates an example repetition 1100 for a PDCCH reception starting at any PDCCH monitoring occasion according to embodiments of the present disclosure. An embodiment of the repetition 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In an active DL BWP 1110 of a serving cell, a gNB provides to a UE a configuration for a control resource set over a number of RBs 1120 of the active DL BWP and over a number of symbols of a slot, such as 2 symbols. The UE is configured a number of PDCCH candidates per CCE aggregation level and per number of repetitions for a PDCCH reception from a set of CCE aggregation levels and a set of numbers of repetitions that includes one and two repetitions. In a first PDCCH monitoring occasion 1130, the UE monitors PDCCH candidates corresponding to one repetition of a PDCCH reception and PDCCH candidates corresponding to two repetitions of a PDCCH reception where the first repetition occurred at a previous PDCCH monitoring occasion. The UE does not detect a DCI format scheduling a PDSCH reception in the first PDCCH monitoring occasion.

In a second PDCCH monitoring occasion 1140, the UE monitors PDCCH candidates corresponding to one repetition of a PDCCH reception and PDCCH candidates corresponding to two repetitions of a PDCCH reception where the first repetition occurred at the first PDCCH monitoring occasion 1145. The UE does not detect a DCI format scheduling a PDSCH reception in the second PDCCH monitoring occasion. In a third PDCCH monitoring occasion 1150, the UE monitors PDCCH candidates corresponding to one repetition of a PDCCH reception and PDCCH candidates corresponding to two repetitions of a PDCCH reception where the first repetition occurred at the second PDCCH monitoring occasion 1155.

The UE detects a DCI format scheduling a PDSCH reception 1160. Although the PDSCH reception is shown to start after a PDCCH reception that includes a DCI format scheduling the PDSCH it may also start at a same time as a first repetition of the PDCCH reception when the UE can buffer received signaling over the whole active DL BWP.

A UE can expect that a number of PDCCH candidates for a first number of repetitions of a PDCCH reception is smaller than or equal to a number of PDCCH candidates for a second number of repetitions of a PDCCH reception when the first number of repetitions is larger than the second number of repetitions. The UE can also expect CCEs for the first number of PDCCH candidates to be a subset of CCEs for the second number of PDCCH candidates. This design can reduce a number of filtering operations for channel estimation as a filtering operation can be shared by PDCCH candidates with different numbers of repetitions for corresponding PDCCH receptions.

For example, for an aggregation level of 8 CCEs, a UE can be configured 2 candidates for 1 repetition of a PDCCH reception in 1 PDCCH monitoring occasion and 1 candidate for 2 repetitions of a PDCCH reception in 2 PDCCH monitoring occasions where for a PDCCH monitoring occasion from the 2 PDCCH monitoring occasions, the CCEs of the PDCCH candidate are the CCEs of either the first of the 2 PDCCH candidates for 1 repetition or of the second of the 2 PDCCH candidates for 1 repetition at the PDCCH monitoring occasion.

With this design, having multiple possible numbers of repetitions for a PDCCH reception increases a respective number of decoding operations a UE needs to perform for a DCI format but does not increase a number of filtering operations for channel estimation. Therefore, PDCCH candidates corresponding to more than one repetition of a PDCCH reception require additional decoding operations that need to be counted towards the upper bound of $M_{PDCCH}^{max,slot,\mu}$ PDCCH candidates per slot while corresponding CCEs do not need to be counted toward the upper bound of $C_{PDCCH}^{max,slot,\mu}$ non-overlapping CCEs per slot.

Repetitions of a PDCCH reception can either be confined within a slot or can continue across slots. In the former case, only a single repetition of a PDCCH reception is supported at a last PDCCH monitoring occasion in a slot. In the latter case, the slot boundary does not affect repetitions of a PDCCH reception.

The parameter $Y_{p,n_s,\mu}$ in Equation 1 for the search space determination can then be replaced by $Y_{p,n_{P,f},\mu}$ where $n_{P,f}^\mu$ is an index of a PDCCH monitoring occasion in a frame for resource control resource set P. It is also possible that, instead of a frame, a different time unit, such as 8 frames or 80 msec, is used for indexing PDCCH monitoring occasions.

Alternatively, in order to enable multiplexing in a same control resource set of PDCCH receptions with one monitoring occasion per slot and PDCCH receptions with multiple respective monitoring occasions per slot, $Y_{p,n_s,\mu}$ can remain as in Equation 1. Then, CCE locations for a same PDCCH candidate at different monitoring occasions in a slot remain same and this is beneficial for reducing channel estimation complexity as a number of non-overlapping CCEs is reduced.

A UE can assume (by default in the system operation or based on higher layer configuration from a serving gNB) a same DM-RS precoding across repetitions of a PDCCH reception, as this can enable the UE to filter respective DM-RS receptions to obtain a channel estimate to demodulate a PDCCH using DM-RS in a current and in previous repetitions of a PDCCH reception in a same slot. When repetitions of a PDCCH reception are not confined within a slot and can continue across slots, a UE may not assume a same precoding for a DM-RS of a PDCCH repetition in a first slot and a DM-RS of a PDCCH repetition in a second slot.

Alternatively, even though the CCE locations for repetitions of a PDCCH reception can be different in different slots, a UE may assume that a DM-RS precoding remains same in all repetitions of the PDCCH reception.

Figure 12:
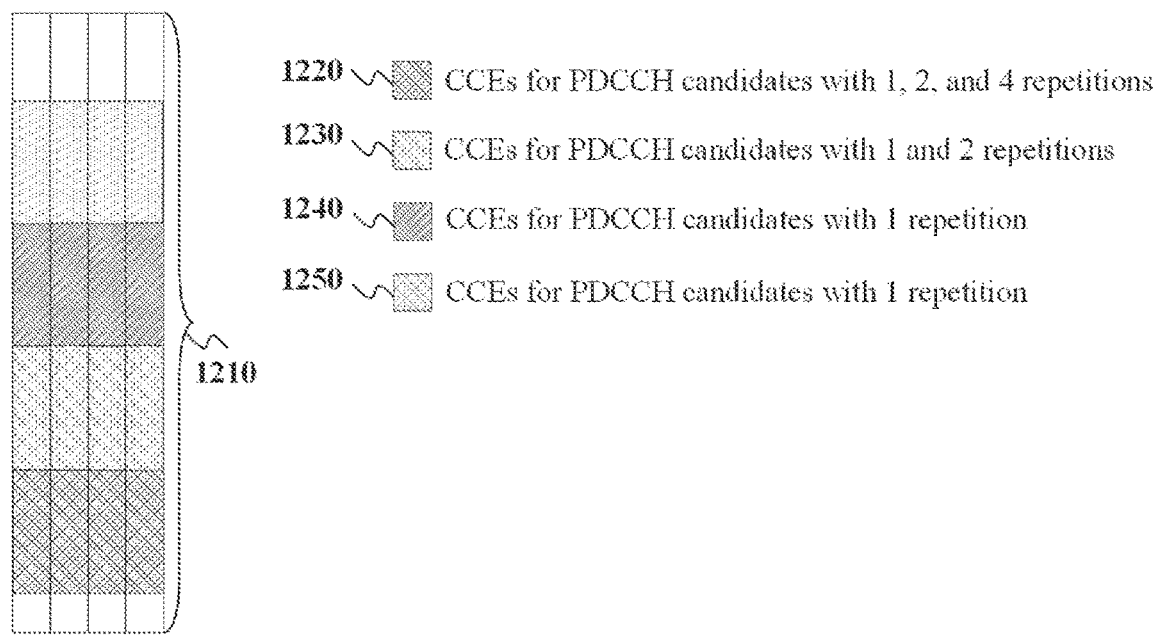
FIG. 12 illustrates an example location of CCEs for PDCCH candidates with different numbers of repetitions for a PDCCH reception according to embodiments of the present disclosure.

FIG. 12 illustrates an example location of CCEs 1200 for PDCCH candidates with different numbers of repetitions for a PDCCH reception according to embodiments of the present disclosure. An embodiment of the location of CCEs 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

For a CCE aggregation level, a UE is configured a search space with 4 PDCCH candidates for 1 repetition of a PDCCH reception, 2 PDCCH candidates for 2 repetitions of a PDCCH reception, and 1 PDCCH candidate for 4 repetitions of a PDCCH reception in a control resource set 1210. The CCEs for the first PDCCH candidate for 1 repetition of a PDCCH reception 1220 are same in any PDCCH monitoring occasion in a slot and are also the CCEs for a first of the two PDCCH candidates for 2 repetitions of a PDCCH reception and for the PDCCH candidate for 4 repetitions of a PDCCH reception.

The CCEs for the second PDCCH candidate for 1 repetition of a PDCCH reception 1230 are same in any PDCCH monitoring occasion in a slot and are also the CCEs for a second of the two PDCCH candidates for 2 repetitions of a PDCCH reception. The CCEs for the third PDCCH candidate 1240 and for fourth PDCCH candidate 1250 for 1 repetition of a PDCCH reception are same in any PDCCH monitoring occasion in a slot.

When a gNB transmits a PDCCH with repetitions, it is possible that the UE detects the PDCCH with a different number of repetitions. For example, a gNB can transmit a PDCCH with two repetitions for a CCE aggregation level and the UE detects the PDCCH with both one and two repetitions for the CCE aggregation level. For example, a gNB can transmit a PDCCH with one repetition for a CCE aggregation level and the UE detects the PDCCH with two repetitions for the CCE aggregation level.

In general, an ambiguity can exist between a gNB and a UE between a number of PDCCH repetitions the gNB used to transmit the PDCCH and a number of PDCCH repetitions the UE used to detect the PDCCH. This ambiguity for an actual number of PDCCH repetitions can affect an ambiguity for a first symbol of a PDSCH reception or a PUSCH transmission.

In order to establish a same understanding between a gNB and a UE for a number of PDCCH repetitions, a DCI format scheduling a PDSCH reception or a PUSCH transmission needs to include the number of repetitions for a PDCCH reception. In addition, when repetitions of a PDCCH reception can start at any PDCCH monitoring occasion, a UE needs to determine a PDCCH monitoring occasion for a first repetition of the PDCCH reception. Approaches for a UE to determine a PDCCH monitoring occasion for a first repetition of a PDCCH reception include the following.

In a first approach, a first repetition of a PDCCH reception can be restricted to be on PDCCH monitoring occasions corresponding to multiples of the number of repetitions. For example, a first PDCCH monitoring occasion with index 0 can be defined over a period of slots, such as 1 slot, 10 slots, 80 slots, or any other number of slots, and a first repetition of a PDCCH reception with 2 repetitions can be on PDCCH monitoring occasions with index 2·i where i is an index of a PDCCH monitoring occasion. In general, a first repetition of a PDCCH reception with $N_{PDCCH}$ repetitions can be on PDCCH monitoring occasions with index $N_{PDCCH}$·i where i is an index of a PDCCH monitoring occasion.

In a second approach, a first repetition of a PDCCH reception can be on any PDCCH monitoring occasion. A scrambling sequence used to scramble a repetition of the PDCCH reception can depend on the PDCCH monitoring occasion of the first repetition. The scrambling sequence can be differentiated by applying a different initialization of a same scrambling sequence where the initialization depends on the PDCCH monitoring occasion of the first repetition.

Therefore, for 2 repetitions of a PDCCH reception, the scrambling sequence is initialized at a current PDCCH monitoring occasion when the first repetition of the PDCCH reception is at the current PDCCH monitoring occasion and is initialized at an immediately previous PDCCH monitoring occasion when the first repetition of the PDCCH reception is at the previous PDCCH monitoring occasion.

A UE can decode a PDCCH candidate received with two repetitions by descrambling the PDCCH according to each possible hypothesis for the first PDCCH monitoring occasion. For example, at a current PDCCH monitoring occasion, the UE can perform a first decoding operation for a PDCCH candidate after descrambling respective CCEs from an immediately previous and from the current PDCCH monitoring occasions with a scrambling sequence initialized at the previous PDCCH monitoring occasion or after descrambling respective CCEs from the current and the immediately next PDCCH monitoring occasions with a scrambling sequence initialized at the current PDCCH monitoring occasion. The UE has to consider these two hypotheses and perform two respective decoding operations. This can be directly generalized to any number of repetitions for a PDCCH reception. The scrambling sequence applied to the DMRS can remain same in all repetitions.

Figure 13:
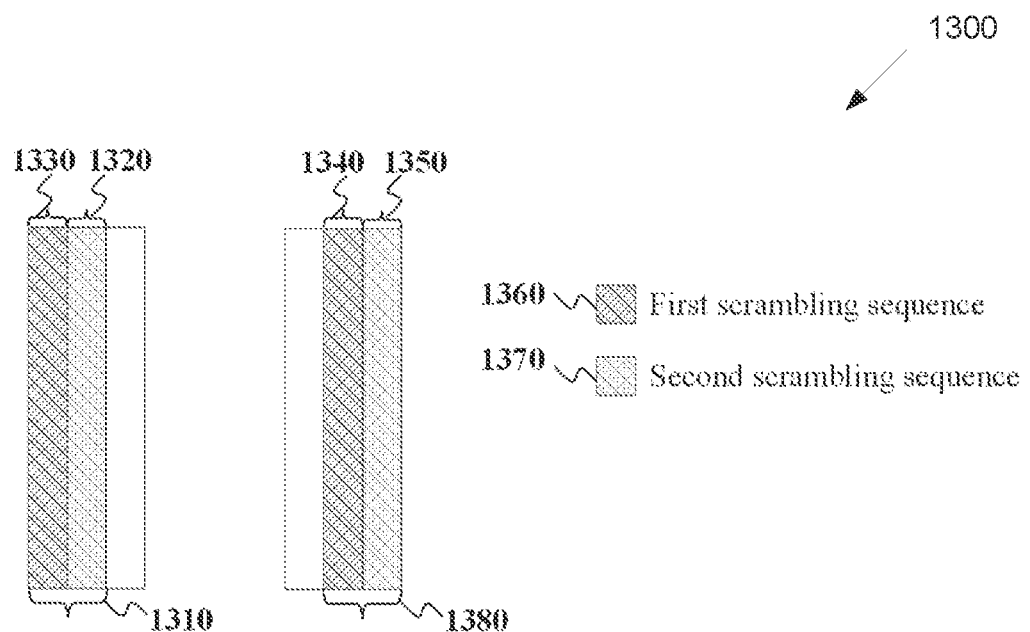
FIG. 13 illustrates an example use of a different sequence for scrambling a repetition of a PDCCH reception based on a repetition number according to embodiments of the present disclosure.

FIG. 13 illustrates an example use of a different sequence 1300 for scrambling a repetition of a PDCCH reception based on a repetition number according to embodiments of the present disclosure. An embodiment of the use of a different sequence 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

For two repetitions of a PDCCH reception 1310 and 1380, a repetition of the PDCCH reception in a second PDCCH monitoring occasion 1320 uses a second scrambling sequence 1370 when the repetition is the second repetition. A repetition of the PDCCH reception in an immediately previous, first, PDCCH monitoring occasion 1330 uses a first scrambling sequence 1360. A repetition of the PDCCH reception in a second PDCCH monitoring occasion 1340 uses a first scrambling sequence 1360 when the repetition is the first repetition. A repetition of the PDCCH reception in an immediately next, third, PDCCH monitoring occasion 1350 uses a second scrambling sequence 1370.

In a second approach, different CCE locations are used depending on a number of a repetition of a PDCCH reception. This can provide interference randomization for repetitions of a PDCCH reception. For example, for a PDCCH reception with 2 repetitions, the CCEs for a PDCCH candidate can be determined as in Equation 1 for the first repetition and can be determined as in Equation 1 by applying an additional shift of $N_{shift}$ CCEs for the second repetition. The number of $N_{shift}$ CCEs can be predetermined in a system operation, such as be equal to the CCE aggregation level of a PDCCH candidate, or a gNB can provide $N_{shift}$ to a UE by higher layer signaling.

The UE can decode a PDCCH candidate for a PDCCH reception with two repetitions by using CCEs determined as in Equation 1 for a previous PDCCH monitoring occasion and using CCEs determined as in Equation 1 and a shift of $N_{shift}$ CCEs for a current PDCCH monitoring occasion, or using CCEs determined as in Equation 1 for a current PDCCH monitoring occasion and using CCEs determined as in Equation 1 and a shift of $N_{shift}$ CCEs for a next PDCCH monitoring occasion.

The UE has to consider two hypotheses and perform two respective PDCCH decoding operations. In case of multiple PDCCH candidates at a PDCCH monitoring occasion, it is possible to alternate a location of CCEs for first and second PDCCH candidates, second and third PDCCH candidates, and so on, and last and first PDCCH candidates, based on a repetition number instead of applying a shift of $N_{shift}$ CCEs. With the application of a shift of $N_{shift}$ CCEs, Equation 1 results to Equation 2a or Equation 2b where the remaining terms are as defined in Equation 1:

$$L \cdot \left\{ \left( Y_{p,n_{s,f}^{\mu}} + \left\lfloor \frac{m_{s,n_{CI}} \cdot N_{CCE,P}}{L \cdot M_{p,s,max}^{(L)}} \right\rfloor + n_{CI} + N_{shift} \right) \mod \left\lfloor \frac{N_{CCE,P}}{L} \right\rfloor \right\} + i \quad \text{Equation 2a}$$

$$L \cdot \left\{ \left( Y_{p,n_{s,f}^{\mu}} + \left\lfloor \frac{m_{s,n_{CI}} \cdot N_{CCE,P}}{L \cdot M_{p,s,max}^{(L)}} \right\rfloor + n_{CI} \right) \mod \left\lfloor \frac{N_{CCE,P}}{L} \right\rfloor \right\} + i + N_{shift} \quad \text{Equation 2b}$$

Figure 14:
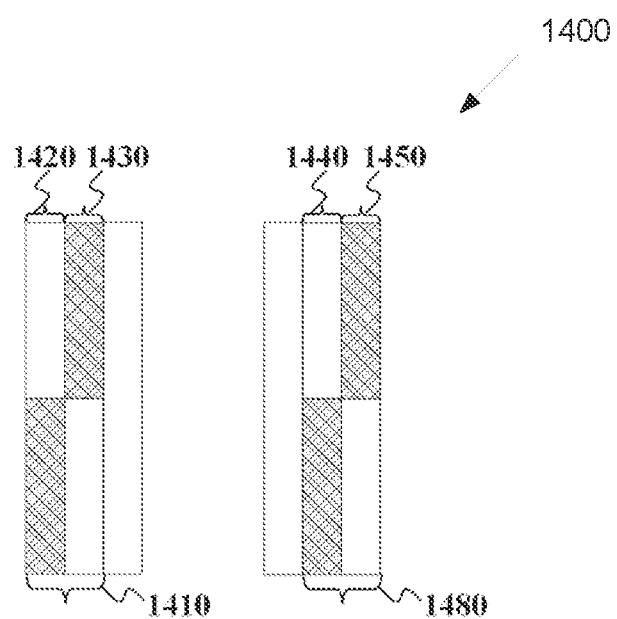
FIG. 14 illustrates an example location of CCEs for PDCCH candidates based on a number of a repetition of a PDCCH reception according to embodiments of the present disclosure.

FIG. 14 illustrates an example location of CCEs 1400 for PDCCH candidates based on a number of a repetition of a PDCCH reception according to embodiments of the present disclosure. An embodiment of the location of CCEs 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

For a CCE aggregation level, a UE is configured a search space that includes a PDCCH candidate with 2 repetitions of a PDCCH reception 1410 and 1480. For decoding a potential DCI format provided by the PDCCH candidate in first and second PDCCH monitoring occasions, the UE uses first CCEs 1420 in the first PDCCH monitoring occasion and uses second CCEs in the second PDCCH monitoring occasion 1430. For decoding a potential DCI format provided by the PDCCH candidate in second and third PDCCH monitoring occasions, the UE uses first CCEs 1440 in the second PDCCH monitoring occasion and uses second CCEs in the third PDCCH monitoring occasion 1450.

In a third approach, the signal of a repetition for a PDCCH reception is multiplied with +1 or −1 depending on the repetition number. For example, a PDCCH corresponding to a first repetition of a PDCCH reception can be multiplied by +1, a PDCCH corresponding to a second repetition of a PDCCH reception can be multiplied by −1, a PDCCH corresponding to a third repetition of a PDCCH reception can be multiplied by +1, a PDCCH corresponding to a fourth repetition of a PDCCH reception can be multiplied by −1, and so on. A different combination for the multiplication coefficients corresponds to a different PDCCH candidate and a UE can decode a PDCCH candidate after multiplying each received repetition with a corresponding element of the combination for the multiplication coefficients.

Complex multiplication can also be used where, for example (1, −j), (−1, −j), (1, j), (−1, j) can be the multiplication factors for the first, second, third, and fourth repetitions of a PDCCH reception, respectively, and the multiplication can apply for every quadruplet of repetitions, when more than one, of the PDCCH reception.

Figure 15:
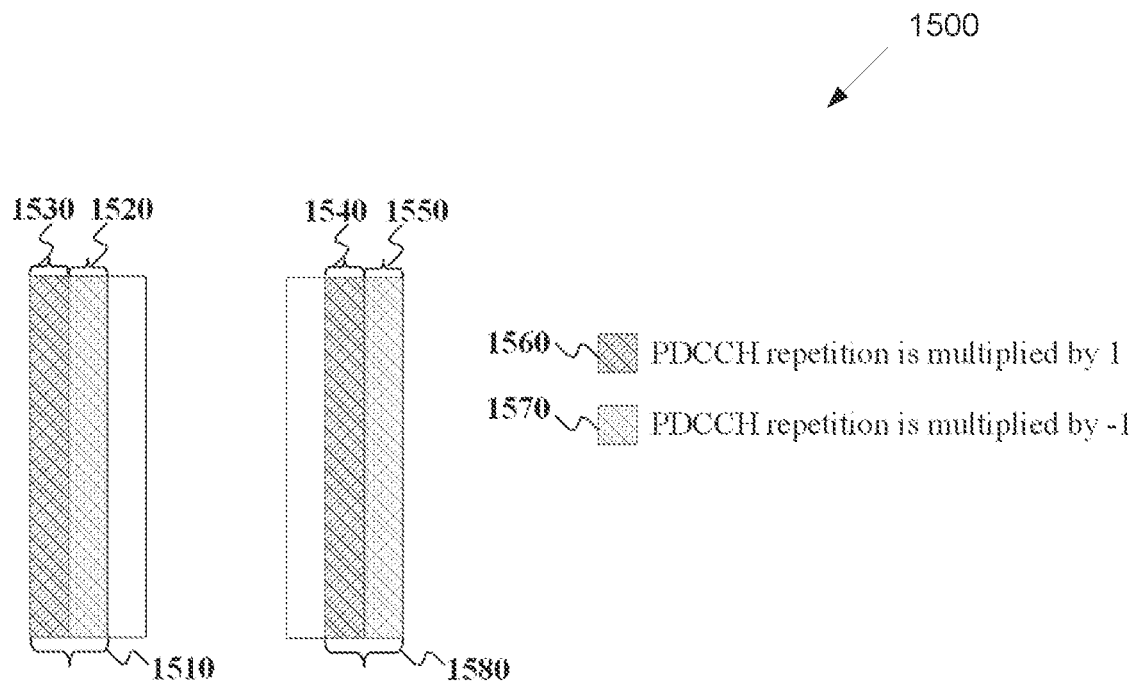
FIG. 15 illustrates an example use of a different multiplication factor for a repetition of a PDCCH reception based on a repetition number according to embodiments of the present disclosure.

FIG. 15 illustrates an example use of a different multiplication factor 1500 for a repetition of a PDCCH reception based on a repetition number according to embodiments of the present disclosure. An embodiment of the use of a different multiplication factor 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15, for two repetitions of a PDCCH reception 1510 and 1580, a repetition of the PDCCH reception in a second PDCCH monitoring occasion 1520 is multiplied by −1 (reversed sign) 1570 when the repetition is the second repetition. A repetition of the PDCCH reception in an immediately previous, first, PDCCH monitoring occasion 1530 is multiplied by 1 (no change) 1560. A repetition of the PDCCH reception in a second PDCCH monitoring occasion 1540 is multiplied by 1 1560 when the repetition is the first repetition. A repetition of the PDCCH reception in an immediately next, third, PDCCH monitoring occasion 1550 is multiplied by −1, 1570.

As an alternative or a complement to supporting repetitions for a PDCCH reception in the time domain, repetitions for a PDCCH reception can be supported in the frequency domain by aggregating CCEs in different control resource sets. As an alternative or a complement to supporting repetitions for a PDCCH reception in the time domain, higher CCE aggregation levels can be supported for UEs requiring repetitions that would otherwise require repetitions of a PDCCH reception. For example, while a maximum size of a control resource set of 3 symbols can be associated with support of a maximum aggregation level of 16 CCEs, a control resource set of 6 symbols can be introduced to support a maximum aggregation level of 32 CCEs.

A UE can skip a PDCCH monitoring occasion, for example when the UE receives information that the symbols of the slot in the PDCCH monitoring occasion have uplink direction. Then, a repetition of a PDCCH reception in the PDCCH monitoring occasion can be dropped and the UE receives the PDCCH by excluding repetitions in PDCCH monitoring occasions that cannot support PDCCH transmissions from a gNB. It is also possible to defer a repetition for a PDCCH reception to a next PDCCH monitoring occasion, instead of dropping the repetition.

A UE can perform a predetermined maximum number of PDCCH decoding operations and a predetermined maximum number of channel estimations, as determined by a number of non-overlapping CCEs, within a slot. Prioritization for allocation of PDCCH decoding operations or of channel estimations is first to DCI formats associated with PDCCH receptions in common search spaces and then to DCI formats associated with PDCCH receptions in UE-specific search spaces according to an ascending order of a UE-specific search space index.

DCI formats associated with low latency services can require multiple PDCCH monitoring occasions within a slot. Then, a UE capability for a maximum number of PDCCH decoding operations or a maximum number of channel estimations within a slot can be reached at least in slots where the UE is expected to also perform PDCCH decoding operations for other DCI formats. Such other DCI format can be UE-group common DCI formats in respective common search spaces, such as DCI format 2_1, 2_2, or 2_3, or other UE-specific DCI formats in respective UE-specific search spaces and also in common search spaces when a DCI format size is same as a UE-group common DCI format size.

Then, dropping all PDCCH candidates in a search space set when a maximum number of PDCCH decoding operations or a maximum number of channel estimations over non-overlapping CCEs within a slot would be exceeded, would result to a UE monitoring only PDCCH candidates for DCI formats received in common search spaces or not monitoring any PDCCH candidates for services that do not require low latency. For other DCI formats, such as ones not associated with low latency services, the UE can drop all PDCCH candidates in a search space set.

An exception can be when the DCI formats have a same size as a predetermined DCI format or a DCI format with a predetermined RNTI that has non-zero PDCCH candidates in the search space set. PDCCH candidate allocation for the latter DCI format is prioritized over PDCCH candidate allocation for the former DCI formats at least when corresponding sizes are different.

To circumvent the above limitations, a UE configured to monitor a predetermined DCI format or a RNTI for a DCI format can adjust a number of PDCCH decoding operations and a number of non-overlapping CCEs available for decoding PDCCH candidates for the DCI format after subtracting a number of PDCCH decoding operations and a number of non-overlapping CCEs for PDCCH candidates for DCI formats received in common search spaces.

For example, for subcarrier spacing configuration µ, and denoting by $M_{PDCCH}^{max,slot,\mu}$ a maximum number of PDCCH decoding operations per slot, $C_{PDCCH}^{max,slot,\mu}$ a maximum number of non-overlapping CCEs per slot, $$M_{PDCCH}^{css} = \sum_{i=0}^{I_{css}-1} \sum_{L} M_{P_{css}(i),S_{css}(i)}^{(L),monitor}$$

a number of PDCCH decoding operations per slot for DCI formats in $I_{css}$ common search spaces and $C_{PDCCH}^{CSS}$ a number of non-overlapping CCEs per slot for DCI formats in common search spaces, the UE can adjust a number of PDCCH candidates $M_{p,s}^{(L,N_{PDCCH})}$ for CCE aggregation L and repetition level $N_{PDCCH}$ for the DCI format as $$\left\lfloor \frac{M_{PDCCH}^{max,slot,\mu} - M_{PDCCH}^{CSS}}{M_{PDCCH}^{max,slot,\mu}} \cdot M_{p,s}^{(L,N_{PDCCH})} \right\rfloor \text{ or as}$$

$$\min\left(1, \left\lfloor \frac{M_{PDCCH}^{max,slot,\mu} - M_{PDCCH}^{CSS}}{M_{PDCCH}^{max,slot,\mu}} \cdot M_{p,s}^{(L,N_{PDCCH})} \right\rfloor \right).$$

For example, for a UE configured with $M_{p,s,n_{CI}}^{(L,1)}=\{4, 2, 1\}$ PDCCH candidates with one repetition and with $M_{p,s,n_{CI}}^{(L,2)}=\{2, 1, 1\}$ PDCCH candidates with two repetitions for CCE aggregation levels L=\{4, 8, 16\}, respectively, needs to perform 11 PDCCH decoding operations for a DCI format in a PDCCH.

Search space design for reducing non-overlapping CCEs for PDCCH receptions with different DCI formats.

A UE is capable of performing $M_{PDCCH}^{max,slot,\mu}$ decoding operations for DCI formats per slot and channel estimation for $C_{PDCCH}^{max,slot,\mu}$ non-overlapping CCEs per slot for a numerology (subcarrier spacing) configuration µ. Typically, a UE reaches the constraint on $C_{PDCCH}^{max,slot,\mu}$ non-overlapping CCEs first and the UE is then not capable of performing additional decoding operations for DCI formats.

A constraint on the number of non-overlapping CCEs that a UE can perform channel estimations over a slot can become more restrictive, leading to increased blocking of PDCCH transmissions, when the UE needs to monitor different DCI formats in same or different control resource sets. For a same control resource set, an objective for a search space design for each DCI format is to minimize a number of non-overlapping CCEs while avoiding an increase in a blocking probability for PDCCH receptions.

A number of overlapped CCEs can be small as a number of candidates per CCE aggregation level can be materially different for different DCI formats. For example, a DCI format with target BLER in the range of 0.001% can have zero candidates for the smaller CCE aggregation levels of 1 CCE or 2 CCEs and have a few candidates for the larger CCE aggregation levels of 8 CCEs or 16 CCEs.

The opposite can apply for a DCI format with target BLER in the range of 1%. Then, as the location of CCEs in the control resource set depends on the CCE aggregation level L, an overlapping of CCEs for DCI formats having materially different target BLERs can occasionally be minimal leading to a UE inability to decode PDCCH candidates as a number of corresponding non-overlapping CCEs can exceed $C_{PDCCH}^{max,slot,\mu}$.

To increase a number of overlapping CCEs, for example for DCI formats having materially different number of PDCCH candidates per CCE aggregation level, a set of CCEs of a first search space set for a first DCI format can be a superset of the set of the CCEs of a second search space set for second DCI formats. As a first DCI format requiring smaller target BLER is likely to require low latency for transmission and have few PDCCH candidates at the larger CCE aggregation levels, a blocking probability for the PDCCH candidates needs to be minimized and corresponding CCEs can be determined as in Equation 1.

Due to the existence of PDCCH candidates for larger CCE aggregation levels, the number of CCEs for the first search space set of the first DCI format with smaller target BLER is likely to be larger than the number of CCEs for the second search space set of the second DCI formats with larger target BLER. Therefore, the set of CCEs corresponding to the first search space set can be the superset of the CCEs for the second search space set.

As transmission of a PDCCH conveying the first DCI format is typically infrequent, blocking of PDCCH transmissions conveying second DCI formats from a PDCCH transmission conveying the first DCI format is unlikely. When a number of CCEs for the first search space set is smaller than a number of CCEs for the second search space set, virtual PDCCH candidates for the highest CCE aggregation level for PDCCH transmission with the first DCI format can be included until a resulting number of CCEs for the first search space set is not smaller than a number of CCEs for the second search space set.

Figure 16:
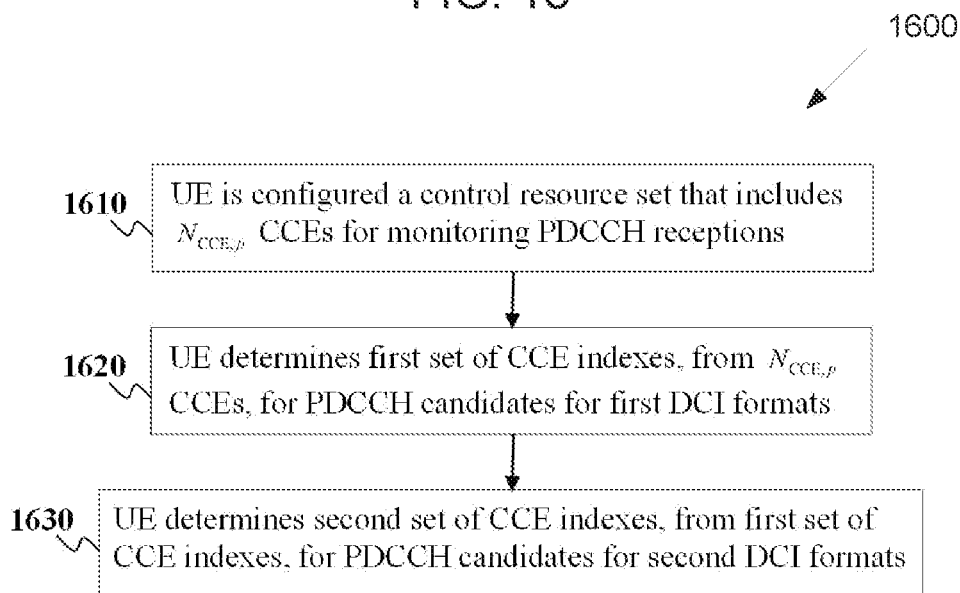
FIG. 16 illustrates an example determination of CCEs for a first search space set for first DCI format and for a second search space set for second DCI formats according to embodiments of the present disclosure.

FIG. 16 illustrates an example determination of CCEs 1600 for a first search space set for first DCI format and for a second search space set for second DCI formats according to embodiments of the present disclosure. An embodiment of the determination of CCEs 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

A UE is configured to monitor PDCCH receptions in a control resource set p that includes $N_{CCE,p}$ CCEs 1610. The UE determines a first set of CCE locations/indexes, from the $N_{CCE,p}$ CCEs, for PDCCH candidates for first DCI formats 1620, for example as in Equation 1. The UE determines a second set of CCE locations/indexes, from the first set of CCEs, for PDCCH candidates for second DCI formats 1630, for example as in Equation 1.

A UE can be configured different PDCCH monitoring patterns in a slot for different DCI formats. For example, the UE can be configured PDCCH monitoring for first DCI formats in more than one occasion in a slot and be configured PDCCH monitoring for second DCI formats in only one occasion in a slot that typically includes up to three symbols at the start of the slot. When first DCI formats require low BLER, a CCE aggregation level for a corresponding PDCCH reception can be large and a corresponding control set size for such PDCCH receptions is large and occurs in the more than one occasion in the slot while PDCCH transmissions that include first DCI formats from a gNB can be infrequent.

It is then disadvantageous for PDSCH receptions by respective UEs that are scheduled by second DCI formats to exclude PRBs corresponding to a control resource set for PDCCH transmissions for first DCI formats. Therefore, when a PDSCH reception scheduled by a second DCI format to a UE includes a number of PRB s from a control resource set that the UE is configured for monitoring PDCCH receptions for first DCI formats, the UE receives the PDSCH in the number of PRB s.

To maintain same CCE indexes/locations for any number of repetitions of a PDCCH reception and allow repetitions to occur in different slots, $Y_{p,n_{s,f}^\mu}$ can be updated every $N_{PDCCH}^{max}$ PDCCH monitoring occasions instead of per slot, starting from a first PDCCH monitoring occasion in a predetermined number of slots such as 10 slots or 80 slots. $N_{PDCCH}^{max}$ is a maximum number of repetitions of a PDCCH reception and can be provided to a UE by higher layer signaling.

Configurable DCI Formats.

A target BLER for a DCI format conveyed by a PDCCH directly depends on a size of the DCI format. Different UEs can experience different SINRs and therefore require different number of resources for a PDCCH reception conveying a same DCI format to experience a same BLER for the DCI format. For example, a first UE experiencing a 3 dB worse SINR than a second UE with a same receiver configuration and a same channel medium would require twice as many resources such as CCEs to experience a same BLER. When the target BLER for a DCI format is materially small, such as 0.001% or 0.0001%, repetitions of a PDCCH reception are likely to be needed in order to provide an effective SINR to achieve the target BLER for the DCI format.

Moreover, a range or existence of fields in a DCI format, such as fields that associate with transmission timing or with number of repetitions, can depend on subcarrier spacing for a corresponding PDSCH reception or PUSCH transmission as the subcarrier spacing determines symbol duration and a received energy over a predetermined number of symbols in a slot.

A tradeoff between a number of resources required to achieve a target BLER for a DCI format and a scheduling flexibility provided by the DCI format for an associated PDSCH reception or PDSCH transmission can be established by adjusting a corresponding DCI format size. By increasing a number of bits of a field in the DCI format, scheduling flexibility increases while the number of resources also increases.

A gNB can control this tradeoff by configuring a size for each field in the DCI format. Additionally, configuration for a size of each field in the DCI format enables achieving a same size for different DCI formats thereby enabling a reduction in a number of decoding operations a UE needs to perform to detect DCI formats at a PDCCH monitoring occasion.

A DL DCI format or an UL DCI format includes a field indicating frequency domain resources (frequency domain resource allocation field) for a corresponding PDSCH reception or PUSCH transmission. Instead of the size of this field to be fixed for a corresponding size of an active DL BWP or an active UL BWP and an RBG size for the active DL BWP or UL BWP to also be fixed so that the whole active DL BWP or UL BWP can be addressed by the frequency domain resource allocation field, the size of the field can be configurable by having a configurable RBG size.

The field size, or equivalently the RBG size, is then derived from the RBG size, or equivalently the size of the field, so that the whole active DL BWP or the active UL BWP can be addressed. For example, for a DL BWP of 100 RBs, the field size can be 25 bits and the RBG size can be 4 RBs. Instead of this partitioning of the DL BWP to RBGs being fixed, it can be configurable and a field size of 5/10/40 bits can result from an RBG size of 20/10/2 RBs, respectively.

A DL DCI formator an UL DCI format includes a field indicating time domain resources (time domain resource allocation field) for a corresponding PDSCH reception or PUSCH transmission. A size of this field can also be configured to a UE by higher layers.

A DL DCI format or an UL DCI format includes a field indicating a modulation and coding scheme (MCS) for a corresponding PDSCH reception or PUSCH transmission. Instead of a size of this field to be fixed in order to address all entries of an MCS table defined in a system operation, the size can be configurable and the entries of the table that it addresses can also be provided by higher layers to a UE or can be the first entries of the table that can be addressed by the MCS field such as the first 16 entries for an MCS field of 4 bits.

For example, instead of a size of an MCS field to be 5 bits in order to address 32 entries of a MCS table defined in a system operation, the size can be 3 bits and the entries of the table can be provided by higher layers. For example, a quasi-stationary UE typically experiences time-invariant SINR and most entries of the MCS table can correspond to MCS values around that SINR and a few entries corresponding to low SINR can be included for robustness.

A DL DCI format or an UL DCI format includes a field indicating a HARQ process number for a transport block in a corresponding PDSCH reception or PUSCH transmission. Different service types or system conditions can be associated with different data rate requirements and corresponding number of HARQ processes. For example, for a service type that does not require peak data rates or for a loaded system, a smaller number of HARQ processes can be configured to a UE relative to a service type that requires peak data rates or for a lightly loaded system. A size for the HARQ process number field can be accordingly adjusted.

A DL DCI format or an UL DCI format includes a field indicating a redundancy version for a transport block in a corresponding PDSCH reception or PUSCH transmission. Different service types or system conditions or target BLERs can be associated with different transport block sizes or need for multiple redundancy versions. For example, for a small transport block size, chase combining can be used and a redundancy version field in unnecessary.

For example, for a low target BLER of a transport block, a redundancy version field in unnecessary or can have 1 bit as retransmissions of the transport block are unlikely. For example, for a large transport block size with relatively large target BLER, incremental redundancy is beneficial and as retransmissions are likely, a redundancy version field can have 2 bits.

A DL DCI format or an UL DCI format includes a field indicating a transmission power control (TPC) command for a corresponding PDCCH transmission or PUSCH transmission. A TPC command can also be provided by a UE-group specific DCI format, such as DCI format 2_2. For a quasi-stationary UE, relying on a UE-group specific DCI format to provide TPC commands can be sufficient and a TPC command does not need to be included in the DL DCI format or UL DCI format.

Conversely, for a non-stationary UE or for a UE having sporadic receptions/transmission and is not addressed by a UE-group specific DCI format, a TPC command field can be included in the DL DCI format or UL DCI format with an increased number of bits to increase a corresponding range of TPC commands.

A DL DCI format or an UL DCI format can also include other fields, such as a number of repetitions, whether receptions/transmissions are localized or interleaved in bandwidth, timing for HARQ-ACK transmission in response to a transport block reception and a corresponding PUCCH resource indication, and so on. Practically an existence or number of bits for all fields depends on UE-specific operating aspects and a corresponding number of bits (size) can be configured by higher layers. A number of zero bits is applicable for a field when a value for the field is provided by higher layers instead of a DCI format or when a functionality of the field is not used for scheduling PDSCH receptions or PUSCH transmissions.

A gNB can configure a UE, with corresponding parameters, one or more first search space sets for monitoring first DL DCI format(s) or UL DCI format(s) having fields with configurable sizes and one or more second search space sets for monitoring a second DL DCI format or UL DCI format having fields with predetermined sizes. The second DL DCI format or UL DCI format can be used for fallback operation and for scheduling a UE prior to configuring the first DL DCI format or second UL DCI format (when the UE monitors PDCCH candidates in a CSS). The second DL DCI format or UL DCI format can have a minimal number of fields with non-zero bits.

For example, the second DL DCI format or UL DCI format may not include, or include with reduced number of bits relative to the first DCI format, a HARQ process number field, a RV field, a HARQ-ACK timing indicator field (a PUCCH transmission timing to convey HARQ-ACK in response to a PDSCH reception can be provided by system information or be predetermined in the system operation), a field providing an indication of frequency-localized or frequency-interleaved/hopped transmission/reception (can always be frequency-interleaved), and so on.

A UE configured to monitor PDCCH for DCI formats with different target BLERs, such as for a first DCI format or for a DCI format with a first RNTI and for a second DCI format or a DCI format with a second RNTI, can also be configured a separate DCI format, or a separate RNTI for a DCI format, providing TPC commands, similar to DCI format 2_2.

This is because due to the different target BLERs of the first DCI format and the second DCI format that are typically associated with different target BLERs for corresponding receptions of transport blocks that are scheduled by the DCI formats, a single DCI format providing TPC commands would need to operate with the lower of the target BLERs and this can often result to inefficient operation or a need for a gNB to transmit multiple PDCCHs conveying the single DCI format for different UEs as some UEs may be configured to monitor PDCCH only for the first DCI format and other UEs may be configured to monitor PDCCH only for the second DCI format.

Therefore, the disclosure considers that a UE can be configured more than one DCI formats providing TPC commands. Remaining parameters for monitoring PDCCH receptions for each of the more than one DCI formats, such as a monitoring periodicity, PDCCH candidates per CCE aggregation level, and control resource set, can also be separately configured for each of the more than one DCI formats.

PDSCH Transmission Without PDCCH.

When a PDSCH reception includes a small transport block of data information, such as up to 32 bytes, an associated PDCCH reception can represent significant overhead when similar BLER targets apply for the DCI format in the PDCCH and the transport block in the PDSCH. A requirement to schedule a PDSCH reception using by a DCI format in a PDCCH can also increase latency as a UE cannot begin processing the transport block in the PDSCH prior to detecting the DCI format in the PDCCH.

Additionally, when a target BLER for the transport block is small, such as 0.001% or 0.0001%, robust reception is required, and it may not rely on detailed CSI feedback from the UE but instead rely on wideband CSI feedback and use frequency diversity. Then, a DCI format indicating specific RBs from an active BWP for a PDSCH reception is not required and interleaved PDSCH transmission over the BWP is sufficient. Time domain resource allocation duration for a PDSCH transmission can be configured by higher layers or a set of possible time domain resource allocation can be jointly considered with a set of possible frequency domain resource allocations where the sets are either defined in a system operation or configured by higher layers.

The modulation scheme can be fixed to QPSK or can be configured by higher layers and does not need to be dynamically indicated by the DCI format.

High data rates are often not an objective and also considering, due to latency restrictions, a small number of retransmissions for a transport block including no retransmissions, the number of HARQ processes can be fixed to 1. A redundancy version can be either avoided as incremental redundancy does not provide material gains over chase combining for small transport blocks or can depend on the PDSCH transmission occasion.

A PDCCH resource for HARQ-ACK transmission in response to the transport block reception can either be configured by higher layers or be implicitly determined based on the RBG index of the corresponding PDSCH reception. For example, the RBGs in the active BWP can be indexed in ascending frequency order and each RBG can have a one-to-one mapping to a PUCCH resource for HARQ-ACK transmission. Timing for the PUCCH transmission can be provided by higher layer signaling relative to a timing of the PDSCH reception, such as a last symbol of the PDSCH reception.

A transmission power control command value for the PUCCH transmission can be provided by a UE-group common DCI format, such as DCI format 2_2, in a PDCCH reception.

In a first approach, under the above design limitations, a PDSCH reception can be treated in a similar manner as a PDCCH reception as there is no information that needs to be provided by a corresponding DCI format. A search space can be defined for a PDSCH transmission where a REG can correspond to a RB group (RBG) with size that can depend on the bandwidth of the active BWP or be configured by higher layers. Similar to a UE monitoring PDCCH for DCI formats with different sizes, the UE can monitor PDSCH for transport blocks of different sires where the possible sizes can be configured to the UE by higher layer signaling from a gNB.

Then, for an active DL BWP that includes $N_{RBG}$ RBGs, a UE can determine $L_{RBG}$ RBGs for PDSCH reception candidate $m_L$, from a total of PDSCH reception candidates $M_L$, as in Equation 3, where $L_{RBG}$ and $M_L$ can be predetermined in a system operation or provided to the UE from the gNB by higher layer signaling, i=0, . . . , $L_{RBG}-1$. $Y_{n_{s,f}^\mu}$ is a random variable that can be defined, for example, as $Y_{n_{s,f}^\mu} = (A_0 \cdot Y_{n_{s,f}^\mu - 1}) \bmod D$ with $Y_{-1} = n_{RNTI} \neq 0$:

$$L_{RBG} \cdot \left\{ \left( Y_{n_{s,f}^\mu} + \left\lfloor \frac{m_L \cdot N_{RBG}}{L_{RBG} \cdot M_L} \right\rfloor \right) \bmod \left\lfloor \frac{N_{RBG}}{L_{RBG}} \right\rfloor \right\} + i \qquad \text{Equation 3}$$

In a second approach under the above design limitations, a PDSCH reception for a transport block with predetermined size can occur in a time-frequency resource from a set of predetermined time-frequency resources in a slot with predetermined parameters such as a modulation scheme. A UE performs a decoding for the transport block using the predetermined parameters for the reception of the transport block, in each time-frequency resource from the set of time-frequency resources.

Instead of having only a predetermined size for a transport block, a set of predetermined sizes can be configured to a UE and the UE can decode a received PDSCH for each transport block size from the configured set of transport block sizes. A separate configuration for corresponding PDSCH reception parameters, such as a modulation scheme, can be provided to the UE by higher layer signaling for each transport block size from the set of transport block sizes.

Figure 17:
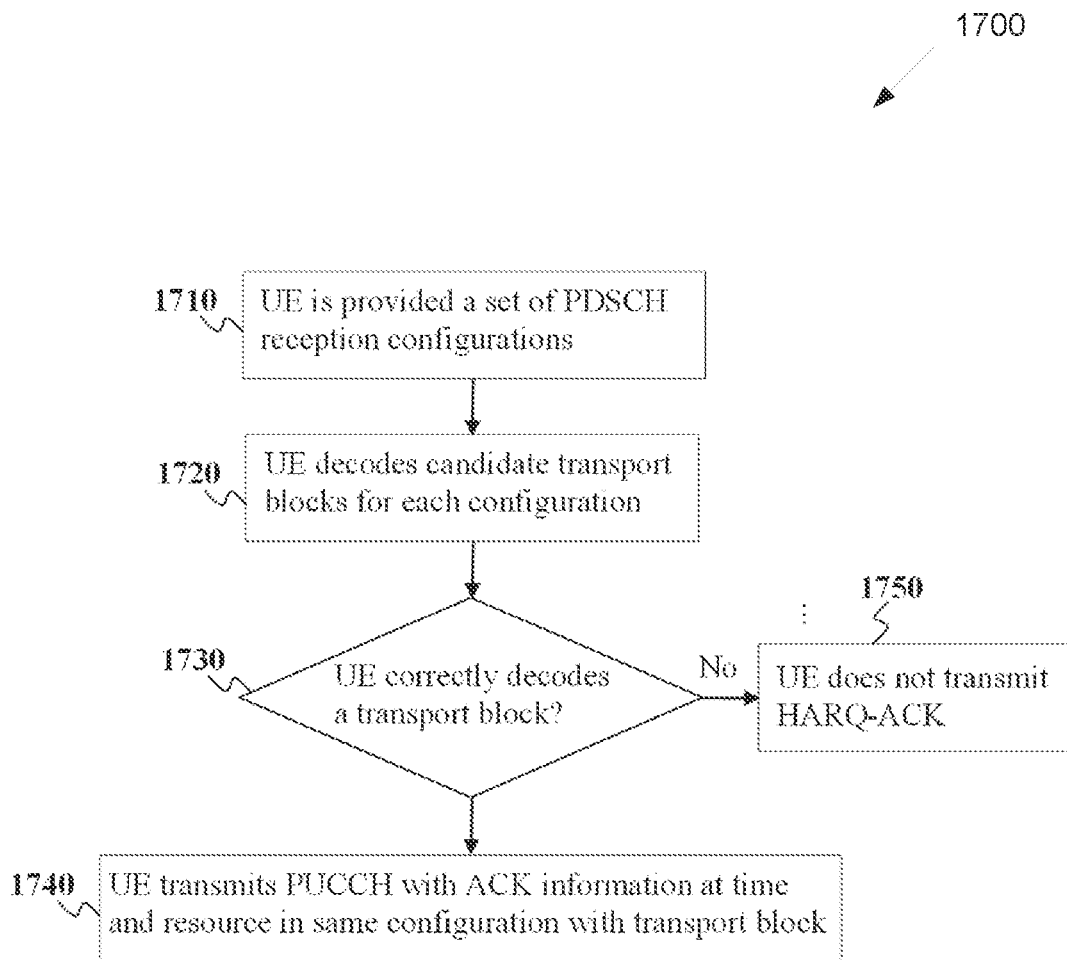
FIG. 17 illustrates an example determination of a PDSCH reception without an associated DCI format according to embodiments of the present disclosure.

FIG. 17 illustrates an example determination of a PDSCH reception 1700 without an associated DCI format according to embodiments of the present disclosure. An embodiment of the determination of a PDSCH reception 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

A UE is provided a set of PDSCH reception configurations in a slot where each configuration in the set of configurations includes time-frequency resources, a transport block size, a modulation scheme, PUCCH timing and a PUCCH resource for HARQ-ACK transmission in response to a transport block reception, a DM-RS configuration, and so on 1710. The UE decodes candidate transport blocks for each configuration 1720.

When the UE correctly decodes a transport block 1730, the UE includes ACK information in a PUCCH that the UE transmits at a time (relative to a last symbol of a corresponding PDSCH) and a resource provided by the configuration associated with the transport block 1740. When the UE does not correctly decode a transport block, the UE does not transmit a PUCCH with HARQ-ACK information 1750. Alternatively, the UE can be configured a PUCCH resource to transmit NACK when the UE does not correctly any transport block in a slot or in time period configured by higher layers.

Broadcast PDSCH with HARQ-ACK Feedback Support.

A broadcast PDSCH transmission can reduce signaling overhead and latency corresponding to transmission of multiple PDCCH and PDSCH to respective multiple UEs when same information needs to be provided to the multiple UEs. For example, if each UE is an industrial device and the message to be conveyed by a PDSCH is termination of operation due to a system failure, a gNB can broadcast a same message to all UEs. However, unlike typical broadcast messages such as for movies where errors can be tolerated and retransmission may not be meaningful, it is important for the gNB to know if any UE from the multiple UEs incorrectly received the transport block in the PDSCH.

The gNB can provide by higher layer signaling to each UE from the multiple UEs with a RNTI, referred to as M-RNTI, included in a DCI format that schedules a multicast/broadcast PDSCH reception to the UE. The DCI format can have a same size with a DCI format scheduling a unicast PDSCH reception to the UE. Upon detection of the DCI format based on the M-RNTI, the UE can transmit HARQ-ACK in a PUCCH resource provided to the UE in advance by the gNB through higher layer signaling.

When for all PUCCH transmissions from the UEs the gNB detects an ACK in response to the multicast PDSCH receptions, the gNB does not need to reschedule the multicast PDSCH reception to the UEs or, to guard against a possibility of a NACK-to-ACK error, the gNB can reschedule the multicast PDSCH reception, potentially with a different redundancy version (the DCI format needs to then include an RV field).

When for a subset of PUCCH transmissions from a corresponding subset of UEs the gNB detects corresponding NACK or a (PDCCH) DTX, the gNB can either re-schedule the multicast PDSCH receptions to the subset of UEs or, when for example the number of UEs is small such as one, schedule a unicast PDSCH reception to each UE from the subset of UEs for a retransmission of the transport block.

For a unicast PDSCH reception, a UE may determine a PUCCH resource for a corresponding PUCCH transmission by different means, such as for example based on an explicit indication by the DCI format scheduling the PDSCH reception for a PUCCH resource from a set of configured PUCCH resources or based on an implicit indication from an index of a first CCE of a corresponding PDCCH, or based on a combination of explicit and implicit methods for examples.

Figure 18:
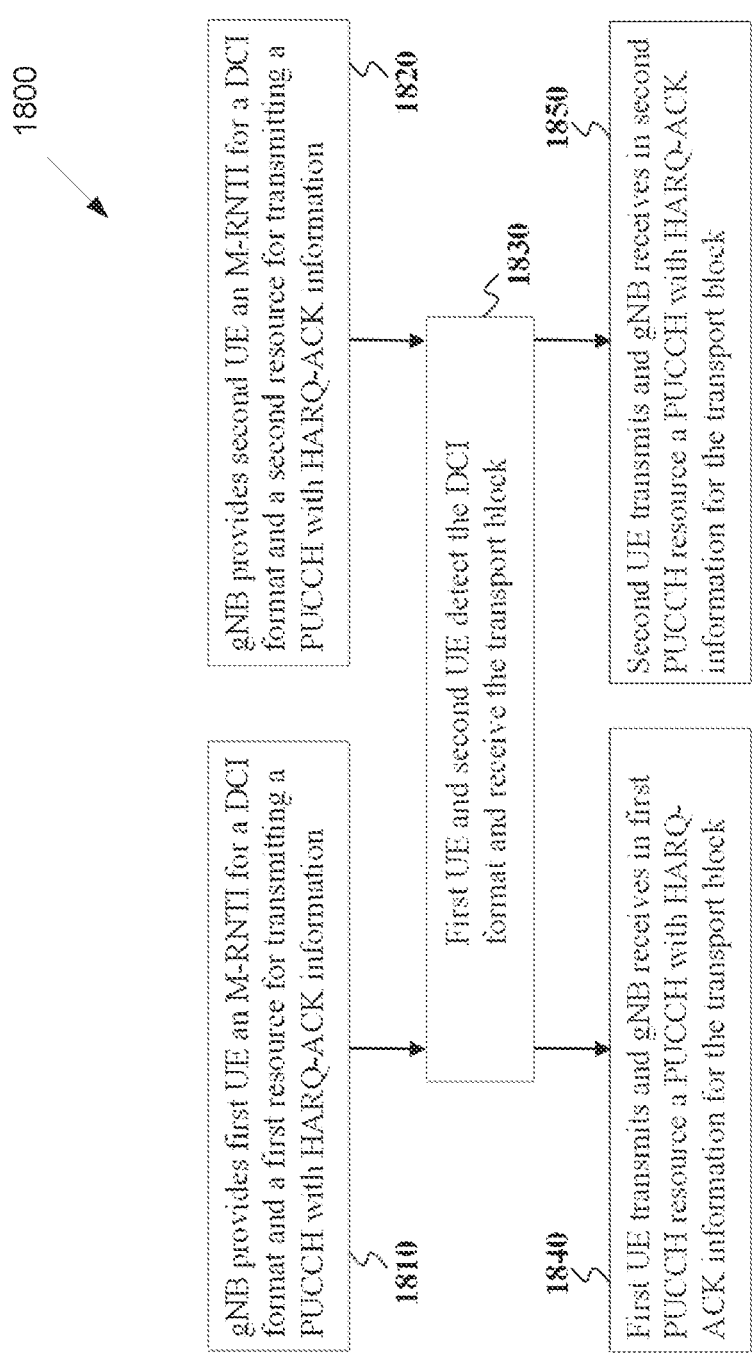
FIG. 18 illustrates an example process for a UE to receive a broadcast/multicast PDSCH and transmit corresponding HARQ-ACK information according to embodiments of the present disclosure.

FIG. 18 illustrates an example process 1800 for a UE to receive a broadcast/multicast PDSCH and transmit corresponding HARQ-ACK information according to embodiments of the present disclosure. An embodiment of the process 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

A gNB provides a first UE with an M-RNTI for a DCI format that schedules a PDSCH reception that includes a transport block and with a first resource for transmitting a PUCCH that includes HARQ-ACK information for the transport block 1810. The gNB provides a second UE with the M-RNTI for the DCI format that schedules the PDSCH reception that includes the transport block and with a second resource for transmitting a PUCCH that includes HARQ-ACK information for the transport block 1820. The first UE and the second UE detect the DCI format and receive the transport block in the PDSCH 1830.

The first UE transmits and the gNB receives in the first PUCCH resource a PUCCH that includes HARQ-ACK information for the transport block 1840. The second UE transmits and the gNB receives in the second PUCCH resource a PUCCH that includes HARQ-ACK information for the transport block 1850.

When one or more from multiple broadcast/multicast PDSCH transmissions can be scheduled to a UE at a same time (including for triggering of PUSCH transmissions from a group of UEs), a UE can be provided with configurations of search space sets for corresponding DCI formats in a same manner as for unicast DCI formats and, in addition to a common search space (CSS) and a UE-specific search space (USS), a multicast/groupcast search space (GSS) can be defined and PDCCH candidates can be determined, for example, by a same search space equation as for USS by using the M-RNTI instead of the C-RNTI to determine $Y_{-1}$.

UR-Group Scheduling.

Using broadcast PDSCH transmission to reduce signaling overhead and latency is not applicable when multiple PUSCH transmissions from respective multiple UEs or when multiple PDSCH receptions with different transport blocks by respective multiple UEs need to be scheduled. Additionally, scheduling such PUSCH transmissions or PDSCH receptions with low latency is not practically feasible as either a control resource set size needs to be impractically large or a UE needs to be configured to monitor PDCCH in a large number of control resource sets to reduce blocking of PDCCH transmissions from a serving gNB and this is also practically infeasible due to UE complexity and bandwidth availability considerations.

The aforementioned limitations for scheduling broadcast PDSCH transmissions or multiple unicast transmissions can be avoided by introducing a new DCI format that schedules multiple PDSCH receptions from or multiple PUSCH transmissions by respective multiple UEs. A UE can be configured a new RNTI, referred to G-RNTI, for a new DCI format. To maintain a same number of decoding operations for DCI formats that a UE needs to perform, the new DCI format can have a same size as another DCI format a UE is expected to decode at a PDCCH monitoring occasion, such as a DCI format scheduling PDSCH reception from or PUSCH transmission only by the UE.

In a first approach, the DCI format includes only the G-RNTI masking CRC bits and a bit-map where a UE is also provided by higher layers a location of a bit in the bit-map. A binary value of "0" can indicate no PDSCH reception or no PUSCH transmission and a binary value of "1" can indicate PDSCH reception or PUSCH transmission for the UE. The UE is provided by higher layers a set of parameters associated with a PDSCH reception or a PUSCH transmission, such as a frequency-domain resource allocation, a time-domain resource allocation, an MCS, a configuration for non-interleaved or interleaved/frequency hopped frequency resource allocation (interleaved PDSCH reception or PUSCH transmission with frequency hopping can be default), a carrier indicator, a PUCCH resource for HARQ-ACK transmission in case of a PDSCH reception, and so on.

In a first alternative, a HARQ process number can always be one. In a second alternative, successive HARQ process numbers can be associated with successive PDCCH monitoring occasion numbers where, for example, a first PDCCH monitoring occasion can be associated with a first HARQ process, a second PDCCH monitoring occasion can be associated with a second HARQ process, and so on. The first PDCCH monitoring occasion can be the first one over a period of slots such as 10 slots, starting from the first slot. In a third alternative, a HARQ process number can be associated with a slot number where, for example, the slot number modulo the total number of HARQ processes is the HARQ process number.

In a first alternative, a redundancy version can always be zero and chase combining can be used for potential retransmissions of a transport block. In a second alternative, considering a small BLER for an initial reception of a transport, potential retransmissions of the transport block can be scheduled by a UE-specific DCI format. Then, the UE-specific DCI format provides the redundancy version is addition to other parameters for a corresponding PDSCH reception or PUSCH transmission. In a third alternative, the same parameters as for the initial transmission of a transport block are used for a retransmission of the transport block, that the UE can expect after reporting a NACK value for the previous reception of the transport block, and the UE can receive a retransmission of the transport block without having to detect an associated DCI format. A predetermined pattern of redundancy version values can be used for retransmissions, such as {0, 2, 3, 1} or {0, 2, 0, 2}.

Figure 19:
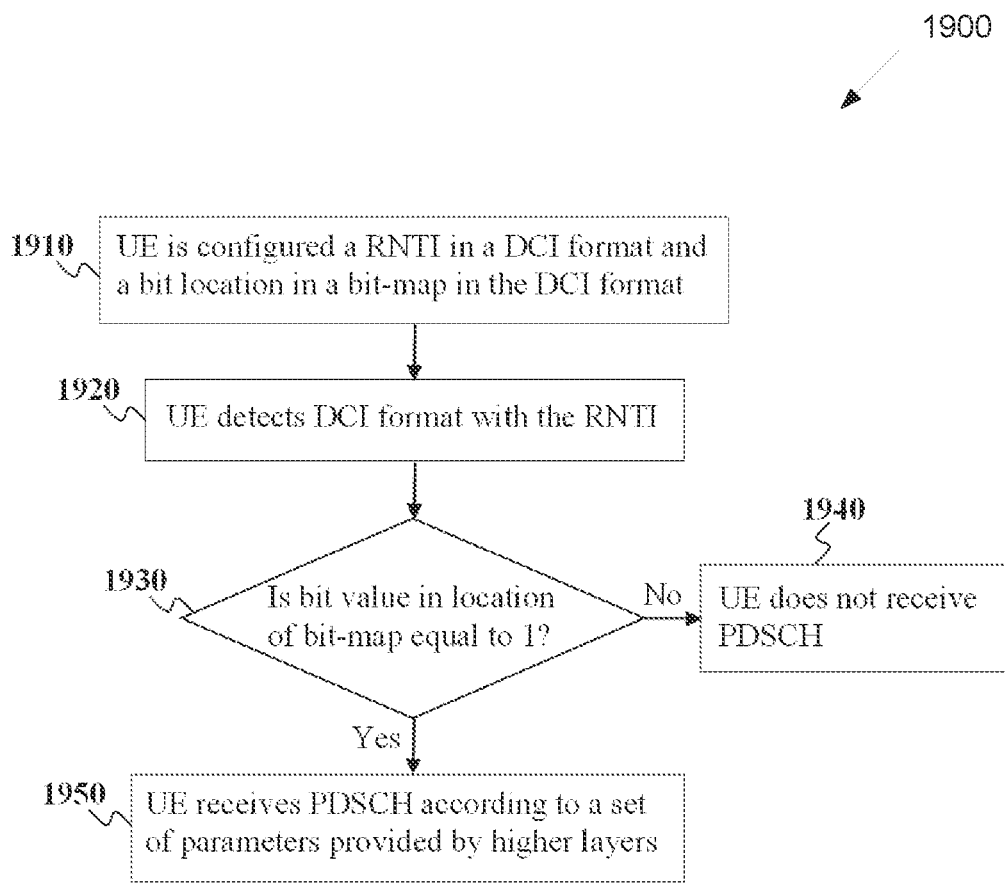
FIG. 19 illustrates an example process for triggering a PDSCH reception by a UE according to embodiments of the present disclosure.

FIG. 19 illustrates an example process 1900 for triggering a PDSCH reception by a UE according to embodiments of the present disclosure. An embodiment of the process 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

A gNB provides by higher layers to a UE a RNTI for a DCI format that includes a bitmap and a location of a bit in the bitmap 1910. The UE detects the DCI format with the RNTI 1920. The UE examines whether the bit in the location in the bitmap has a value of 1 1930. When the bit does not have a value of 1, the UE does not receive the PDSCH 1940. When the bit has a value of 1, the UE receives the PDSCH according to a configuration for a set of corresponding PDSCH reception parameters that is provided in advance to the UE by the gNB using higher layer signaling 1950.

When the DCI format is used to trigger multiple PDSCH receptions or to trigger both PDSCH receptions and PUSCH transmissions, the approach can be generalized, and the UE can be provided multiple corresponding RNTIs or multiple corresponding bit locations in the bitmap included in the DCI format with the RNTI.

In a second approach, the DCI format includes the G-RNTI masking CRC bits and a UE is also provided by higher layers a location of a number of bits in the DCI format. The number of bits can also be provided by higher layers or be predetermined in the system operation. A value for the number of bits corresponds to a configuration, from a set of configurations provided to the UE by higher layers, for PDSCH reception parameters or PUSCH transmission parameters, such as one or more of the parameters provided by unicast DCI formats scheduling PDSCH reception of PUSCH transmission only from the UE and include a CRC scrambled by a C-RNTI.

In addition to data information, a UE can also transmit control information in a PUSCH. A conventional method for determining a number of coded modulation symbols for a UCI type multiplexed in a PUSCH is by applying an offset factor to a ratio of the total number of REs available for UCI/data multiplexing over the total number of information bits of code blocks for UL-SCH of the PUSCH transmission and scaling by the number of information bits and CRC bits for the UCI type.

For example, for HARQ-ACK information, Equation 4 describes a determination for a number of coded modulation symbols $Q'_{ACK}$ in a PUSCH given by:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=0}^{N_{symb,all}^{PUSCH}-1} M_{sc}^{UCI}(l) \right\rceil \right\} \quad \text{Equation 4}$$

In Equation 4, $O_{ACK}$ is a number of HARQ-ACK information bits; if $O_{ACK} \geq 360$, $L_{ACK}=11$; otherwise $L_{ACK}$ is a number of CRC bits; $\beta_{offset}^{PUSCH}=\beta_{offset}^{HARQ\text{-}ACK}$; $C_{UL\text{-}SCH}$ is a number of code blocks for UL-SCH of the PUSCH transmission; $K_r$ is the r-th code block size for UL-SCH of the PUSCH transmission; $M_{sc}^{UCI}(l)$ is the number of REs available for data/UCI multiplexing in symbol l, for l=0, 1, 2, ..., $N_{symb,all}^{PUSCH}-1$, and $N_{symb,all}^{PUSCH}$ is the total number of PUSCH symbols; α is a parameter provided by higher layers; and $l_0$ is a symbol index of a first symbol that does not carry DMRS for the PUSCH and is after the first DMRS symbol(s) in the PUSCH.

A determination of $Q'_{ACK}$ may in principle be inversely proportional to a spectral efficiency of data information as defined by the ratio of the total number of REs actually used for data multiplexing, $N_{RE,U}$, over $$\sum_{r=0}^{C_{UL\text{-}SCH}-1} K_r.$$

However, in Equation 4, the total number of REs $$N_{RE,A} = \sum_{l=0}^{N_{symb,all}^{PUSCH}-1} M_{sc}^{UCI}(l)$$

is the one that is available for multiplexing data information in the PUSCH and $N_{RE,A} > N_{RE,U}$. Therefore, by using $N_{RE,A}$ instead of $N_{RE,U}$ in Equation 1, $Q'_{ACK}$ is overestimated. This overestimation is typically small when $$\sum_{r=0}^{C_{UL\text{-}SCH}-1} K_r$$

is much larger than $O_{ACK}$ as most REs are then allocated to data information and $N_{RE,U}$ is similar to $N_{RE,A}$. However, when $$\sum_{r=0}^{C_{UL\text{-}SCH}-1} K_r.$$

$BLER_{Data}$ is comparable to $O_{ACK} \cdot BLER_{ACK}$, where $BLER_{Data}$ is a target BLER for data information in the PUSCH and $BLER_{ACK}$ is a target BLER for HARQ-ACK information in the PUSCH, $N_{RE,U}$ can be materially smaller than $N_{RE,A}$ leading to an unnecessary overestimation for $Q'_{ACK}$. The problem is circular as in order to determine $N_{RE,A}$, the value of $Q'_{ACK}$ (and the corresponding values for other UCI types, such as CSI, if multiplexed in the PUSCH) is needed while the value of $N_{RE,A}$, is needed to determine $Q'_{ACK}$.

A transmission power for a PUSCH $P_{PUSCH,b,f,c}(i, j, q_d, l)$ on UL BWP b of carrier f of serving cell c using parameter set configuration with index j and PUSCH power control adjustment state with index l in PUSCH transmission occasion i is determined as described in Equation 5 with the parameters defined in NR specification.

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10} \\ (2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{array} \right\} [dBm] \quad \text{Equation 5}$$

In case of UCI-only transmission in the PUSCH, $\Delta_{TF,b,f,c}(i)=10 \log_{10}((2^{BPRE \cdot K_s}-1) \cdot \beta_{offset}^{PUSCH})$ for $K_s=1.25$ where $BPRE=O_{CSI}/N_{RE}$, $O_{CSI}$ is a number of CSI part 1 bits including CRC bits, and $N_{RE}$ is the number of resource elements determined as $N_{RE}=M_{RB,b,f,c}^{PUSCH}(i)$.

$$\sum_{j=0}^{N_{symb,b,f,c}^{PUSCH}(i)-1} N_{sc,data}^{RB}(i, j),$$

where $N_{symb,b,f,c}^{PUSCH}(i)$ is a number of symbols for PUSCH transmission occasion i on UL BWP b of carrier f of serving cell c, and $N_{sc,data}^{RB}(i, j)$ is a number of subcarriers excluding DM-RS subcarriers in PUSCH symbol j, $0 \leq j < N_{symb,b,f,c}^{PUSCH}(i)$. A value of $BPRE=O_{CSI}/N_{RE}$ provides an accurate value for a number of bits per RE (BPRE) when there is only CSI part 1 multiplexed in the PUSCH. However, when there are additional UCI types, such as HARQ-ACK information or CSI part 2, $BPRE=O_{CSI}/N_{RE}$ is not accurate as it considers only CSI part 1 over the total number of REs.

In case a UE would simultaneously transmit a PUCCH and one or more PUSCHs, the UE can either multiplex UCI in a PUSCH and drop the PUCCH transmission or simultaneously transmit the PUCCH and the one or more PUSCHs. When the UCI types require substantially different reliability than the data information in the PUSCHs or when the UCI types correspond to different data information types, such as ones associated with scheduling by different DCI formats, multiplexing UCI in a PUSCH can be problematic or complex.

Simultaneous PUCCH and PUSCH transmissions can then be supported but it is typically not feasible in practice for a UE to simultaneously transmit multiple PUCCHs.

Therefore, UCI multiplexing in a PUSCH together with simultaneous PUCCH and PUSCH transmissions need to be supported at a same time when there are multiple UCI of a same type or data information based on a corresponding association with multiple types of DCI formats that are differentiated, for example, by RNTI or by DCI format size.

Therefore, there is a need to inform a UE how to combine LLRs for an initial transmission and for one or more retransmissions of a transport block.

There is another need to indicate to a UE a size of a DCI format with configurable size for at least one field prior to the configuration of the size for the at least one field.

There is another need to define a UE behavior when the UE is configured to decode a number of UE-specific DCI formats that is larger than a corresponding UE capability.

There is another need to improve a determination for a number of coded modulation symbols for a UCI type multiplexed in a PUSCH transmission.

There is another need to define a $\Delta_{TF,b,f,c}(i)$ value for determining a PUSCH transmission power when the PUSCH includes CSI part 1 and additional UCI types and does not include UL-SCH.

Finally, there is a need to determine conditions for simultaneous PUCCH and PUSCH transmissions and for multiplexing UCI in a PUSCH transmission.

Combining Multiple Receptions of a Transport Block Prior to Decoding.

In order for a UE to properly combine soft metrics, referred to as log-likelihood ratios (LLRs), from an initial reception of a transport block and from subsequent receptions of the transport block prior to decoding, the UE needs to know the target BLER for the transport block in each of the receptions. This is not necessary when the target BLER does not materially change for each reception of the transport block, or when a ratio of a power of a DMRS used for demodulation of data symbols and a power of the data symbols is invariant. However, this is necessary, in terms of increasing performance gains from retransmissions, when the target BLER for the initial reception of the transport block and for any of the subsequent receptions of the transport block can be different, or when the DMRS power does not change by a same factor, between an initial transmission and a retransmission of a transport block, as the data power.

In a first approach, a DCI format scheduling a PDSCH reception by the UE can include a field indicating a target BLER for an associated transport block or a weight factor for the corresponding LLRs. For example, a 2-bit weight factor field can indicate a weight factor of {1.0, 0.75, 0.5, 0.25} with respective binary values of {00, 01, 10, 11}. If a PDSCH reception can be scheduled by more than one DCI formats, such as DCI format 1_0 and DCI format 1_1, the weight factor field may not be included in some of the DCI formats, such as DCI format 1_0. In such cases, a default value for the weight factor can be 1.0 or provided by higher layers. This can allow a serving gNB to use a relatively arbitrary power, including a same power, for a transmission of a DMRS that the UE used to demodulate data symbols in the PDSCH.

In a second approach, a weight factor value for the LLRs associated with different receptions of a same transport block can be implicitly derived from a mapping between a set of weight factor values provided by higher layers and a value of a field in a DCI format scheduling an associated PDSCH. For example, the field can be a redundancy version field of 2 bits where a value of "00," "01," "10," or "11" can map to a first, second, third, or fourth elements from the set of weight factor values provided by higher layers.

Figure 20:
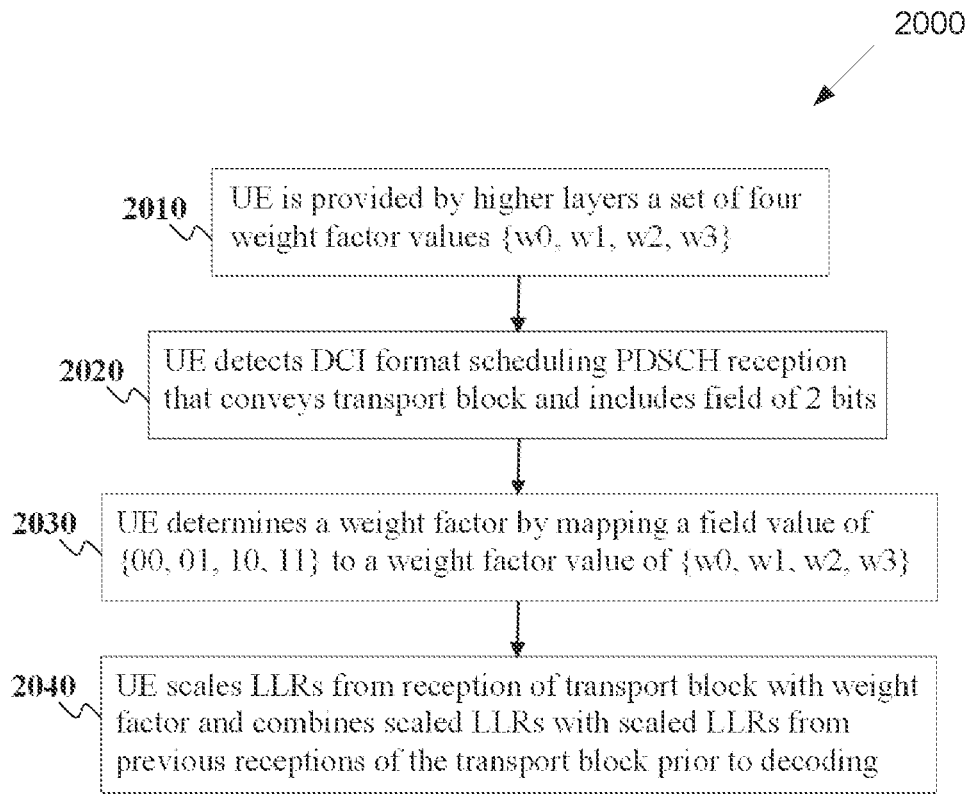
FIG. 20 illustrates an example determination of a weight factor for combining a transport block reception with other transport block receptions prior to decoding according to embodiments of the present disclosure.

FIG. 20 illustrates an example determination of a weight factor 2000 for combining a transport block reception with other transport block receptions prior to decoding according to embodiments of the present disclosure. An embodiment of the determination of a weight factor 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

A UE is provided by higher layers a set of four weight factor values {w0, w1, w2, w3} such as {1.0, 0.75, 0.5, 0.25} 2010. The UE detects a DCI format scheduling a PDSCH reception that conveys a transport block and includes a field of 2 bits, such as a redundancy version (RV) field 2020. The UE determines a weight factor for combining LLRs corresponding to the reception of the transport block with LLRs corresponding to other receptions of the transport block 2030 where, for example, the field binary value of {00, 01, 10, 11} indicates a weight factor value of {w0, w1, w2, w3}, respectively. The UE scales the LLRs from the reception of the transport block with the weight factor and combines the scaled LLRs with scaled LLRs from previous receptions of the transport block, when any, prior to decoding 2040.

Indication of a DCI Format Size.

In a first approach for enabling a UE to monitor DCI formats with reduced size, the UE monitors a first DCI format and a second DCI format. The first DCI format includes fields that are either predetermined in the system operation or indicated to the UE by higher layer signaling in a system information block (SIB). The second DCI format includes at least one field with size (number of bits, including 0 bits) that is indicated to the UE by UE-dedicated higher layer signaling. The first DCI format and the second DCI format can schedule either PDSCH receptions to the UE or PUSCH transmissions from the UE.

When a configuration of fields in the first DCI format is provided by a SIB, the SIB indicates the fields in the DCI format from a set of predetermined fields. Using a SIB to indicate a configuration of fields in the DCI format can be useful for overhead reduction in case a gNB prefers to configure same fields for all UEs that are served by the gNB (otherwise, UE-specific signaling can be used). For example, for a set of 10 predetermined fields in the system operation, a bit-map of {1, 1, 1, 1, 0, 0, 1, 1, 1, 1} in the SIB indicates that all fields except the fifth and sixth fields are included in the first DCI format.

For example, for a set of 10 predetermined fields, 4 configurations can be predetermined in the system operation, such as {field0, . . . , field6}, {field0, . . . , field7}, {field0, . . . , field8}, {field0, . . . , field9}, and a field of 2 bits in the SIB can indicate one of the 4 configurations. If the size of each field is predetermined in the system operation, the first DCI format size is determined from the configuration of fields. If the size of at least one field is not predetermined in the system operation but instead can have a value from a predetermined set of values for the at least one field, the configuration of the at least one field can also include the size of the field.

For example, a second bit-map for fields with size that is not predetermined can indicate one of two possible sizes. For example, for the at least one field with non-predetermined size, a set of configurations for the size can be predetermined in the system operation and a field in the SIB can indicate one of the configurations. For example, for 3 fields that can have two possible sizes, a set of four configurations can be {size00, size10, size20}, {size00, size10, size21}, {size01, size11, size20}, and {size01, size11, size21}, and a field of 2 bits in the SIB can indicate one configuration. The field in the SIB can be the same as the one that indicates a combination of fields in the DCI format. Then, the field in the SIB jointly indicates a combination of fields in the DCI format and their respective sizes.

When different types/categories of UEs are indicated different resources for PRACH transmission, it is also possible for the configuration for the fields of the first DCI format to be provided in a random access response (RAR) because a serving gNB can determine a UE type and accordingly adjust the contents of the RAR. Scheduling of a SIB reception or of a RAR reception can be by a DCI format with fields and respective field sizes that are predetermined in the system operation.

Figure 21:
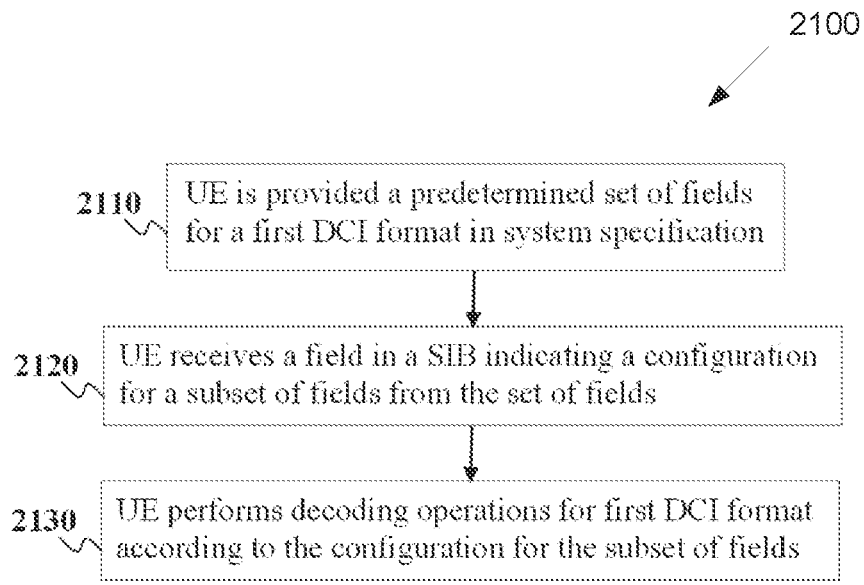
FIG. 21 illustrates an example determination by a UE of a configuration of fields for a first DCI format according to embodiments of the present disclosure.

FIG. 21 illustrates an example determination by a UE 2100 of a configuration of fields for a first DCI format according to embodiments of the present disclosure. An embodiment of the determination by a UE 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

A UE is provided with a predetermined set of fields for a first DCI format by the specification of a system operation 2110. The UE receives a SIB that includes a field indicating a configuration for a subset of fields, from the predetermined set of fields, for the first DCI format 2120. The UE performs decoding operations for the first DCI format according to the configuration for the subset of fields 2130.

The second DCI format can have a same size as the first DCI format. The first and second DCI formats can be differentiated through a 1-bit flag field in each of the two DCI formats.

In a second approach for enabling a UE to monitor DCI formats with reduced size, the UE monitors a first subset of DCI formats, from a set of DCI formats defined in the specification of the system operation, for scheduling PDSCH receptions or PUSCH transmissions prior to establishing RRC connection with a serving gNB. For example, the first subset of DCI formats can be as described in NR specification and are monitored in a common search space (CSS) that does not depend on a RNTI that is provided to the UE after establishing RRC connection. Each DCI format from the first subset of DCI formats has predetermined size and fields that are independent of the UE type.

Upon establishing UE-dedicated RRC configuration, a UE can signal to a serving gNB a second subset of DCI formats, from the set of DCI formats defined in the specification of the system operation, for scheduling PDSCH receptions or PUSCH transmissions. The determination by the UE can be based, for example, on a service type or a maximum data rate that the UE supports. The indication can be explicit or implicit.

Explicit indication is by the UE indicating to the serving gNB the second subset of DCI formats. Implicit indication can be by the UE indicating a service type or, equivalently, UE type or category and, based on the indication, a serving gNB can configure the second subset of DCI formats, or configure fields and respective sizes (including a size of zero bits) for at least one DCI format from the second subset of DCI formats.

The UE monitors PDCCH in a UE-specific search space only for the second subset of DCI formats for scheduling UE-specific PDSCH receptions or PUSCH transmissions and monitors PDCCH in a common search space only for the first subset of DCI formats for scheduling PDSCH receptions associated with a SIB, a RAR, a paging message, or for scheduling UE-specific PDSCH receptions or PUSCH transmissions. The first subset and the second subset of DCI formats may not have any common DCI formats.

DCI formats with RNTI that is configured to a UE by UE-dedicated higher layer signaling, such as DCI formats with a TPC-PUSCH-RNTI, TPC-PUCCH-RNTI, TPC-SRS-RNTI, SFI-RNTI, INT-RNTI, are in the first subset of DCI formats. All DCI formats in the first subset of DCI formats may have a same size.

Figure 22:
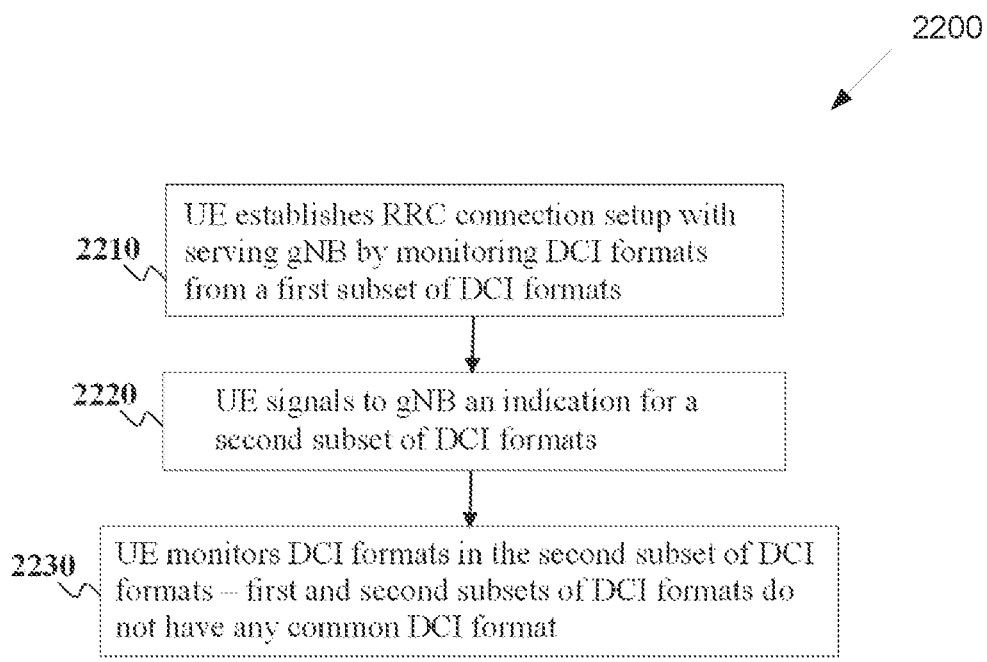
FIG. 22 illustrates example determination by a UE of DCI formats for scheduling PDSCH receptions or PUSCH transmissions according to embodiments of the present disclosure.

FIG. 22 illustrates example determination by a UE 2200 of DCI formats for scheduling PDSCH receptions or PUSCH transmissions according to embodiments of the present disclosure. An embodiment of the determination by a UE 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

A UE establishes RRC connection setup with a serving gNB by monitoring PDCCH for DCI formats from a first subset of DCI formats in a CSS 2210. The UE, explicitly or implicitly, signals to the serving gNB an indication to monitor DCI formats from a second subset of DCI formats 2220. The UE performs decoding operations for DCI formats from the second subset of DCI formats by monitoring PDCCH in a USS 2230. The first and second subsets of DCI formats do not have common DCI formats. Any DCI format in the first subset of DCI formats can have a different size than any DCI format in the second subset of DCI formats. All DCI formats in the second subset of DCI formats can have a same size.

UE Capability to Monitor a Number of DCI Formats.

For a UE supporting multiple service types, it is beneficial for the UE to monitor PDCCH for DCI formats with sizes that are appropriate for each service type. For example, for a UE supporting MBB service and AR/VR service, it is beneficial that DCI formats used for scheduling transmissions/receptions of MBB transport blocks have larger sizes that DCI formats used for scheduling transmissions/receptions of AV/VR transport blocks as the two service types have different requirements for maximum transport block sizes, reliability, and latency.

A UE does not expect to be configured to monitor DCI formats that have more than 4 different sizes per cell or DCI formats with CRC scrambled by a C-RNTI that have more than 3 different sizes per cells. Although a DCI format for scheduling UE-specific PDSCH receptions or PUSCH transmissions can have an RNTI different than a C-RNTI, as described in NR specification, the disclosure considers that RNTI to be same as the C-RNTI for the purpose of determining a total number of respective DCI format sizes. Therefore, if a UE supports both MBB and AR/VR services and if DCI formats used to schedule AR/VR traffic have different size(s), such as smaller size, than DCI formats used to schedule MBB traffic, a total number of sizes for UE-specific DCI formats that the UE is configured to monitor in a cell can be larger than 3.

A first approach to enable a UE to support multiple service types with a size of DCI formats providing scheduling for at least one of the service types being different (smaller) than a size of any DCI format providing scheduling for the other service types, is to introduce a new UE capability. For example, a UE with the new UE capability can decode up to 4, instead of 3, sizes of DCI formats with CRC scrambled by a C-RNTI per cell.

If a UE indicates to a serving gNB a capability to monitor up to 4 sizes of DCI formats with CRC scrambled by a C-RNTI per cell, the serving gNB can configure the UE to monitor DCI formats with a same size that is different (for example, smaller) than a size of DCI format 0_0 and DCI format 1_0. The size is also different than a size of DCI format 0_1 and DCI format 1_1. If the UE does not indicate to the serving gNB a capability to monitor up to 4 sizes of DCI formats with CRC scrambled by a C-RNTI per cell, the serving gNB can configure the UE to monitor only DCI format 0_0 and DCI format 1_0 for at least one service type. Instead of a C-RNTI, the UE can be configured a different RNTI, such as an MCS-C-RNTI, to monitor DCI format 0_0 and DCI format 1_0 for at the least one service type. The serving gNB can configure the UE to also monitor DCI format 0_1 or DCI format 1_1 for another service type.

Figure 23:
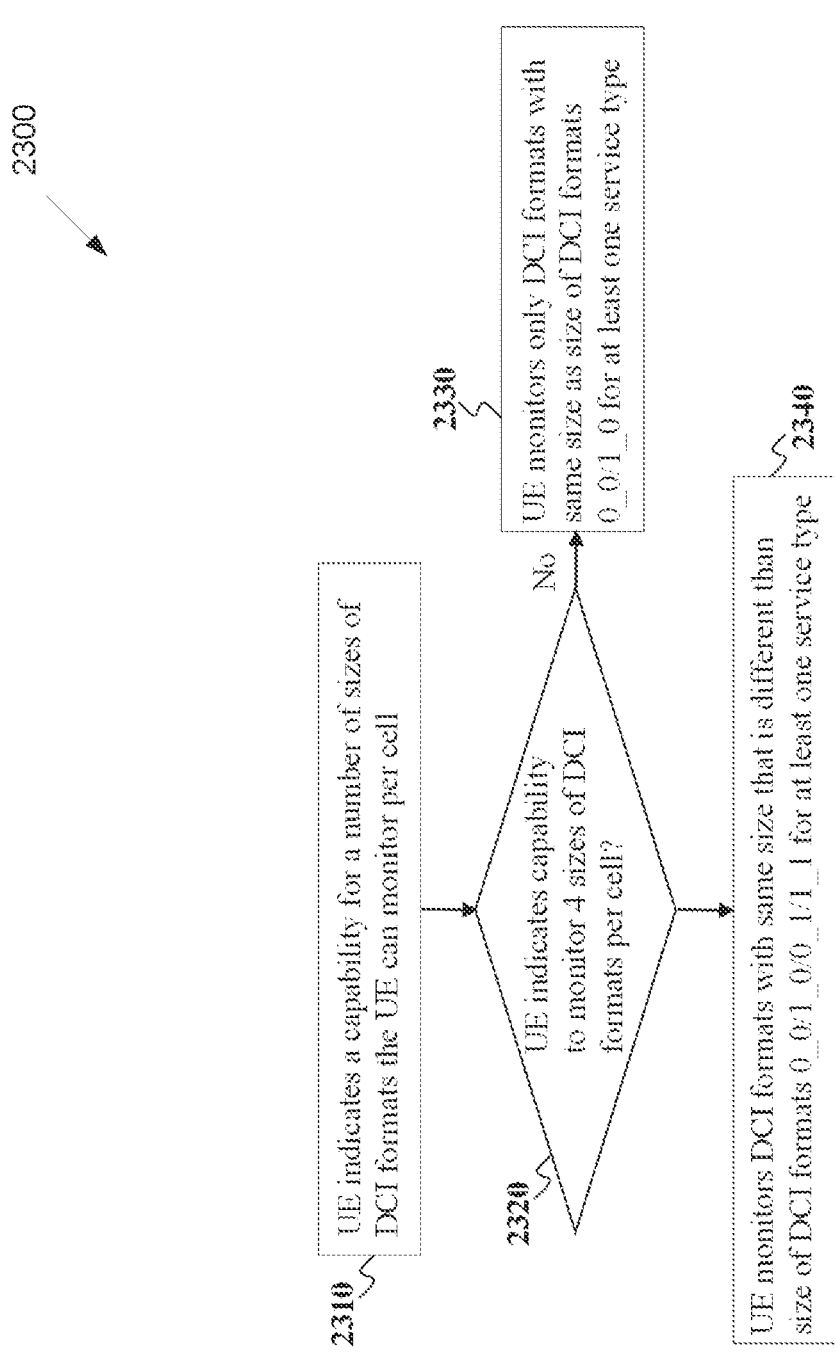
FIG. 23 illustrates an example process for supporting scheduling to a UE for at least one service type with a size of DCI formats that is different than a size of any DCI format supporting scheduling to the UE for another service type according to embodiments of the present disclosure.

FIG. 23 illustrates an example process 2300 for supporting scheduling to a UE for at least one service type with a size of DCI formats that is different than a size of any DCI format supporting scheduling to the UE for another service type according to embodiments of the present disclosure. An embodiment of the process 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

A UE indicates a capability for a number of sizes of DCI formats that the UE can monitor per cell where the DCI formats schedule UE-specific PDSCH receptions or PUSCH transmissions 2310. For example, a RNTI of the DCI formats can be a C-RNTI, a CS-RNTI, an MCS-C-RNTI, and so on. When the UE indicates a capability for monitoring 4 sizes of DCI formats 2320 then, for scheduling associated with at least one service type, the UE monitors DCI formats with a same size that is different (smaller) than a size of DCI format 0_0, DCI format 1_0, DCI format 0_1, and DCI format 1_1 2330. When the UE does not indicate a capability for monitoring 4 sizes of DCI formats 820 then, for scheduling associated with at least one service type, the UE monitors only DCI formats with a same size as a size of DCI format 0_0 and DCI format 1_0 2340 (or as a size of DCI format 0_1 or as a size of DCI format 1_1).

A second approach to enable a UE to support multiple service types with a size of DCI formats for scheduling of at least one of the service types being different (smaller) than a size of any DCI format for scheduling of other service types is to condition a UE capability to monitor up to 3 sizes of DCI formats with CRC scrambled by a C-RNTI per cell to be per PDCCH monitoring occasion and not across all PDCCH monitoring occasions.

When, due to a monitoring periodicity of DCI formats, the UE has to monitor more than 3 sizes of DCI formats with CRC scrambled by a C-RNTI at a same PDCCH monitoring occasion, the serving gNB can configure the UE the sizes of DCI formats that the UE is not required to monitor. It is also possible that the sizes can be predetermined in the specification of the system operation such as for example the sizes can be the ones for DCI format 0_1 or DCI format 1_1.

A third approach to enable a UE to support multiple service types with a size of DCI formats for scheduling of at least one of the service types being different (smaller) than a size of any DCI format for scheduling of other service types is to maintain a maximum of 4 different sizes of DCI formats to monitor per cell but also allow all sizes to be for DCI formats with CRC scrambled by a C-RNTI. If at a PDCCH monitoring occasion the UE has to monitor more than 4 sizes of DCI formats then, similar to the second approach, a serving gNB can configure the UE the sizes of DCI formats with CRC scrambled by a C-RNTI that the UE is not required to monitor.

Determination for Number of Coded Modulation Symbols for a UCI Type in a PUSCH.

In a first approach, to avoid over-dimensioning a number of coded modulation symbols for UCI in a PUSCH with UL-SCH as it was previously described with reference to Equation 1, the determination for the number of UCI coded modulation symbols can be based on the spectral efficiency $SE = Q_m \cdot R$ of the UL-SCH in the PUSCH instead of the ratio $$\sum_{l=0}^{N_{symb,all}^{PUSCH}-1} M_{sc}^{UCI}(l) \Big/ \sum_{r=0}^{C_{UL-SCH}-1} K_r.$$

R is a code rate of a transport block transmission in the PUSCH, and $Q_m$ is the modulation order of data symbols in the PUSCH. Then, a number of coded modulation symbol for UCI, such as HARQ-ACK information $Q'_{ACK}$, multiplexing in the PUSCH can be determined using $Q_m \cdot R$ instead of $$\sum_{l=0}^{N_{symb,all}^{PUSCH}-1} M_{sc}^{UCI}(l) \Big/ \sum_{r=0}^{C_{UL-SCH}-1} K_r,$$

for example as in Equation 6:

$$Q'_{ACK} = \min\left\{ \left\lceil \frac{(O_{ACK} + L_{ACK}) \cdot \beta_{offset}^{PUSCH}}{Q_m \cdot R} \right\rceil, \left\lceil \alpha \cdot \sum_{l=l_0}^{N_{symb,all}^{PUSCH}-1} M_{sc}^{UCI}(l) \right\rceil \right\}$$

Equation 6

In a second approach, in addition to the number of data information bits as captured by $$\sum_{r=0}^{C_{UL-SCH}-1} K_r,$$

the number of UCI bits scaled by a corresponding $\beta_{offset}^{PUSCH}$ to account for a difference relative to data information in a target BLER and coding gain is added to $$\sum_{r=0}^{C_{UL\text{-}SCH}-1} K_r,$$

Then, the ratio $$\sum_{l=0}^{N_{symb,all}^{PUSCH}-1} M_{sc}^{UCI}(l) \Bigg/ \left( \sum_{r=0}^{C_{UL\text{-}SCH}-1} K_r + (O_{ACK} + L_{ACK}) \cdot \beta_{offset}^{PUSCH} \right)$$

is representative of a reference spectral efficiency for the combined data information and UCI multiplexing in the PUSCH and a number of coded modulation symbol for UCI, such as HARQ-ACK information $Q'_{ACK}$, multiplexing in the PUSCH can be determined, for example, as in Equation 7:

$$Q'_{ACK} = \min \left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r + (O_{ACK} + L_{ACK}) \cdot \beta_{offset}^{PUSCH}} \right\rceil, \left\lceil \alpha \cdot \sum_{l=l_0}^{N_{symb,all}^{PUSCH}-1} M_{sc}^{UCI}(l) \right\rceil \right\}$$

Equation 7

A PUSCH transmission from a UE can be with a number of $N_{repeat}^{PUSCH}$ repetitions that is, for example, indicated by a DCI format scheduling the PUSCH transmission. In such case, a spectral efficiency for data information in the PUSCH transmission depends on the number of repetitions. When the UE multiplexes UCI in one of the repetitions of the PUSCH transmission, a value of $\beta_{offset}^{PUSCH}$ used for determining a number of UCI coded modulation symbols may adjust to the spectral efficiency of the data information that is inversely scaled by the number of $N_{repeat}^{PUSCH}$ repetitions.

When a value of $\beta_{offset}^{PUSCH}$ is provided by higher layers, the value is a reference one, $\beta_{offset,ref}^{PUSCH}$, that corresponds to a predetermined or configured number of repetitions for a PUSCH transmission such as a single transmission ($N_{repeat}^{PUSCH}=1$). Then, to compensate for a lower spectral efficiency of data information in a PUSCH transmission with $N_{repeat}^{PUSCH}$ repetitions, the UE can apply a value of $\beta_{offset}^{PUSCH}=N_{repeat}^{PUSCH} \cdot \beta_{offset,ref}^{PUSCH}$ for determining a number of UCI coded modulation symbols.

Transmission Power Adjustment for UCI-Only PUSCH.

A UCI-only PUSCH (without UL-SCH) may include different UCI types and their combinations. For example, a UCI-only only aperiodic CSI, only HARQ-ACK information, or both aperiodic CSI and HARQ-ACK information.

When a UCI-only PUSCH transmission includes aperiodic CSI information, regardless of whether or not the UCI-only PUSCH transmission also includes HARQ-ACK information, the aperiodic CSI information includes CSI part 1 and CSI past 2. Due to a restriction of a maximum code rate that the UE is provided by higher layers for multiplexing aperiodic CSI in available PUSCH, a UE may drop, at least partly, CSI part 2 multiplexing when there are no sufficient resources to achieve a code rate smaller than the maximum code rate. Therefore, it is preferable that a PUSCH transmission power is determined only based on CSI part 1.

As previously described with reference to Equation 5, a value of $BPRE=O_{CSI}/N_{RE}$, where $O_{CSI}$ is the CSI part 1 payload (including CRC bits), provides an accurate BPRE value only when there is only CSI part 1 and there is no CSI part 2 or HARQ-ACK information multiplexed in a UCI-only PUSCH. When there are additional UCI types, such as HARQ-ACK information or CSI part 2, $BPRE=O_{CSI}/N_{RE}$ is not accurate for determining a power adjustment factor $\Delta_{TF,b,f,c}(i)$ on UL BWP b of carrier f of serving cell c using parameter set configuration with index j in PUSCH transmission occasion i. This is because, when CSI part 1 is not the only UCI type in a UCI-only PUSCH, the number of REs $N_{RE}$ available for UCI multiplexing is not used to multiplex only CSI part 1. For CSI multiplexing, available REs are the PUSCH REs excluding DM-RS REs and REs used for phase-tracking RS.

In a first approach, $BPRE=O_{CSI}/N_{RE}$ is replaced by the spectral efficiency indicated by the DCI format scheduling the UCI-only PUSCH transmission. Then, BPRE can be based on the spectral efficiency $Q_m \cdot R$, for example $BPRE=Q_m \cdot R$, where $Q_m$ is a modulation order for CSI part 1 coded information bits and R is a code rate for CSI part 1 bits. A same determination, for example $BPRE=Q_m \cdot R$, can apply also when a PUSCH transmission includes UL-SCH and then $Q_m$ is a modulation order for coded information bits of data information and R is a code rate for data information bits.

In a second approach, when a UE also multiplexes HARQ-ACK information in a UCI-only PUSCH, since the multiplexing of HARQ-ACK information is prioritized relative to CSI multiplexing, it is possible that multiplexing of CSI part 1 is at least partly dropped. For example, dropping of some CSI part 1 reports can occur when, after multiplexing HARQ-ACK information, a number of available REs is not sufficient to achieve a code rate for the CSI part 1 reports that is smaller than or equal to a maximum code rate provided by higher layer.

A UE can determine existence of HARQ-ACK information in a UCI-only PUSCH from the fields of DCI formats scheduling a UCI-only PUSCH transmission and from determination of a HARQ-ACK information codebook. Then, the BPRE can be based on the transmission of HARQ-ACK information bits instead of CSI part 1 report bits.

Simultaneous Transmissions of UCI and Data Information.

UCI multiplexing in a PUSCH can depend on several conditions in addition to conditions related to timing requirements.

A first condition is for the data information and for the UCI multiplexed in the PUSCH to be associated with a same service type as this is identified by respective DCI formats or higher layer configuration. A PUSCH transmission can include a first category or a second category of data information and correspond to a first DCI format or to a second DCI format. The DCI formats can be identified, for example, based on corresponding RNTIs such as a C-RNTI and an MCS-C-RNTI.

Alternatively, when both DCI formats include a CRC scrambled by a same RNTI, such as a C-RNTI, the DCI format can be identified based on corresponding sizes, such as a DCI format 0_0 and a DCI format with size smaller than DCI format 0_0. Similar, when UCI is HARQ-ACK information, the HARQ-ACK information can be of a first category or a second category where, similar to data information, the identification can be based on DCI formats scheduling respective PDSCH receptions (or SPS PDSCH release).

When a PUSCH transmission or a PUCCH transmission is configured by higher layers, the higher layer configuration can identify, implicitly or explicitly, the category of the data information or of the UCI information for a same UCI type, such as a first or a second category using a 1-bit identification/tag.

When a UE would simultaneously transmit a first PUCCH that includes a first UCI category, a second PUCCH that includes a second UCI category, and a PUSCH, the following apply. When the UE is configured for simultaneous PUCCH and PUSCH transmissions, the UE multiplexes the UCI information that is of a same category as data information in the PUSCH transmission and multiplexes the other UCI category, when any, in the associated PUCCH transmission. When the UE is not configured for simultaneous PUCCH and PUSCH transmissions, the UE determines the channel to transmit based on prioritization rules.

When a second category of data information has higher priority than a first category of data information and the PUSCH includes data information of the second category, the UE drops the transmission of the first PUCCH and multiplexes the second UCI category in the second PUSCH transmission. When the PUSCH includes data information of the first category, the UE can be configured by higher layers whether to transmit only the second PUCCH (and not transmit the PUSCH with data information of the first category), at least when the second UCI category corresponds to HARQ-ACK information, or whether to multiplex all UCI in the PUSCH transmission.

A second condition for a UE to simultaneously transmit PUCCH and PUSCH, when the UE is configured for simultaneous PUCCH and PUSCH transmissions, is for a corresponding PUCCH resource for the PUCCH transmission to have a same first and last symbol as the PUSCH transmission. When the PUCCH resource for the PUCCH transmission does not have a same first and last symbol as the PUSCH transmission, the UE behavior is same as when the UE is not configured for simultaneous PUCCH and PUSCH transmissions.

A reason for not enabling simultaneous PUCCH and PUSCH transmissions that do not completely align in a time domain is to avoid variations in UE transmission power that can result to a phase discontinuity thereby degrading reception reliability for one or for both transmissions depending on the arrangement for the partial time overlapping.

Figure 24:
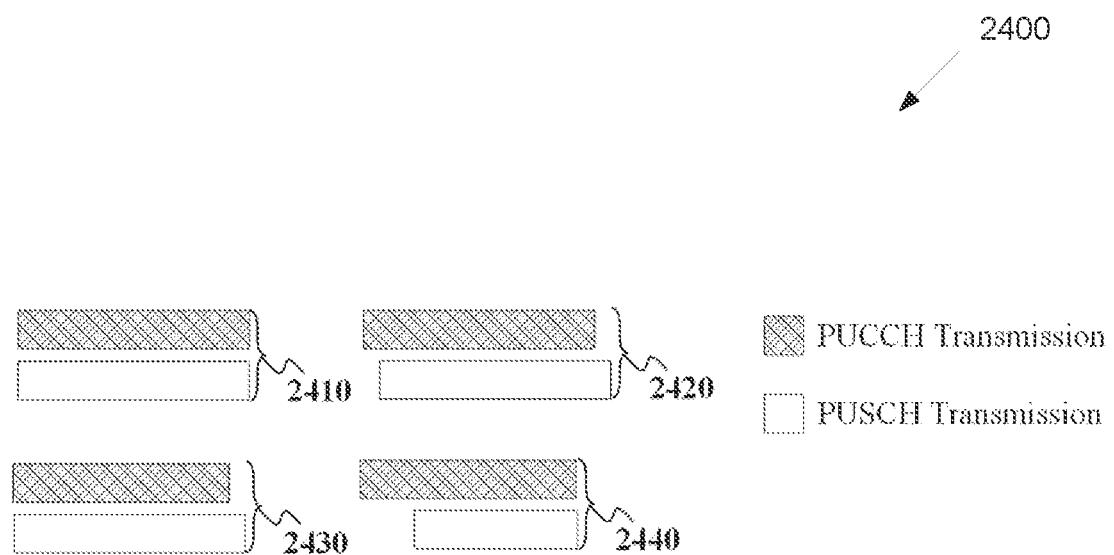
FIG. 24 illustrates an example realization for configurations of simultaneous PUCCH and PUSCH transmissions according to embodiments of the present disclosure.

FIG. 24 illustrates an example realization 2400 for configurations of simultaneous PUCCH and PUSCH transmissions according to embodiments of the present disclosure. An embodiment of the realization 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

For the configuration of simultaneous PUCCH and PUSCH transmissions in 2410, corresponding first and last symbols are the same, and the UE transmits both the PUCCH and the PUSCH. For the configurations of simultaneous PUCCH and PUSCH transmissions in 2420, 2430, and 2440, corresponding first or last symbols are different, the UE multiplexes associated UCI in the PUSCH, and transmits only the PUSCH.

A third condition for a UE to simultaneously transmit PUCCH and PUSCH, when the UE is configured for simultaneous PUCCH and PUSCH transmissions, is for a difference in respective transmission powers or for a difference in respective power spectral densities to be smaller than a threshold. The threshold can be specified in the system operation or be provided to the UE by higher layers. When the difference is smaller than the threshold (or is not larger than the threshold), the UE transmits both the PUCCH and the PUSCHs (this can also be subject to other aforementioned conditions being fulfilled); otherwise, the UE multiplexes the UCI in the PUSCH and transmits only the PUSCH.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for providing first uplink control information (UCI), the method comprising:
   determining:
   that a transmission of a first physical uplink control channel (PUCCH) would overlap in time with a transmission of a physical uplink shared channel (PUSCH), and
   a first priority for the first PUCCH and a second priority for the PUSCH; and
   transmitting:
   only the PUSCH when the first priority is same as the second priority, wherein the PUSCH includes the first UCI, and
   both the PUSCH and the first PUCCH when the first priority is different than the second priority, wherein the first PUCCH includes the first UCI.

2. The method of claim 1, further comprising:
   determining:
   that a transmission of a second PUCCH with second UCI would overlap in time with the transmission of the PUSCH, and
   the first priority for the second PUCCH; and
   dropping transmission for the second PUCCH, wherein:
   the first priority is different than the second priority, and
   the PUSCH includes the second UCI.

3. The method of claim 2, wherein the first UCI and the second UCI have different block error rates.

4. The method of claim 1, further comprising:
   receiving information for simultaneous PUCCH and PUSCH transmissions.

5. The method of claim 1, wherein the first priority or the second priority is indicated by:
   a downlink control information (DCI) format configuring the PUSCH transmission or the first PUCCH transmission, or
   higher layer signaling configuring the PUSCH transmission or the first PUCCH transmission.

6. The method of claim 1, wherein the first UCI includes at least one of:
   hybrid automatic repeat request acknowledgement (HARQ-ACK) information,
   scheduling request (SR) information, and
   channel state information (CSI) reports.

7. The method of claim 1, wherein:
   the PUSCH transmission is over N slots, wherein N is larger than one,
   the first UCI is included in the PUSCH over one slot, and
   a number of resource elements for the first UCI in the PUSCH is proportional to N.

8. A user equipment (UE) comprising:
   a processor configured to determine:
      that a transmission of a first physical uplink control channel (PUCCH) would overlap in time with a transmission of a physical uplink shared channel (PUSCH), and
      a first priority for the first PUCCH and a second priority for the PUSCH; and
   a transceiver, operably coupled to the processor, the transceiver configured to transmit:
      only the PUSCH when the first priority is same as the second priority, wherein the PUSCH includes first uplink control information (UCI), and
      both the PUSCH and the first PUCCH when the first priority is different than the second priority, wherein the first PUCCH includes the first UCI.

9. The UE of claim 8, wherein:
   the processor is further configured to determine:
      that a transmission of a second PUCCH with second UCI would overlap in time with the transmission of the PUSCH, and
      the first priority for the second PUCCH; and
   the transceiver is further configured to drop transmission for the second PUCCH, wherein:
      the first priority is different than the second priority, and
      the PUSCH includes the second UCI.

10. The UE of claim 9, wherein the first UCI and the second UCI have different block error rates.

11. The UE of claim 8, wherein the transceiver is further configured to receive information for simultaneous PUCCH and PUSCH transmissions.

12. The UE of claim 8, wherein the first priority or the second priority is indicated by:
   a downlink control information (DCI) format configuring the PUSCH transmission or the first PUCCH transmission, or
   higher layer signaling configuring the PUSCH transmission or the first PUCCH transmission.

13. The UE of claim 8, wherein the first UCI includes at least one of:
   hybrid automatic repeat request acknowledgement (HARQ-ACK) information,
   scheduling request (SR) information, and
   channel state information (CSI) reports.

14. The UE of claim 8, wherein:
   the PUSCH transmission is over N slots, wherein N is larger than one,
   the first UCI is included in the PUSCH over one slot, and
   a number of resource elements for the first UCI in the PUSCH is proportional to N.

15. A base station comprising:
   a processor configured to determine:
      that a reception of a first physical uplink control channel (PUCCH) would overlap in time with a reception of a physical uplink shared channel (PUSCH), and
      a first priority for the first PUCCH and a second priority for the PUSCH; and
   a transceiver, operably coupled to the processor, the transceiver configured to receive:
      only the PUSCH when the first priority is same as the second priority, wherein the PUSCH includes first uplink control information (UCI), and
      both the PUSCH and the first PUCCH when the first priority is different than the second priority, wherein the first PUCCH includes the first UCI.

16. The base station of claim 15, wherein:
   the processor is further configured to determine:
      that a reception of a second PUCCH with second UCI would overlap in time with the reception of the PUSCH, and
      the first priority for the second PUCCH; and
   the transceiver is further configured to drop reception for the second PUCCH, wherein:
      the first priority is different than the second priority, and
      the PUSCH includes the second UCI.

17. The base station of claim 15, wherein the transceiver is further configured to transmit information for simultaneous PUCCH and PUSCH transmissions.

18. The base station of claim 15, wherein the first priority or the second priority is indicated by:
   a downlink control information (DCI) format configuring the PUSCH reception or the first PUCCH reception, or
   higher layer signaling configuring the PUSCH reception or the first PUCCH reception.

19. The base station of claim 15, wherein the first UCI includes at least one of:
   hybrid automatic repeat request acknowledgement (HARQ-ACK) information,
   scheduling request (SR) information, and
   channel state information (CSI) reports.

20. The base station of claim 15, wherein:
   the PUSCH reception is over N slots, wherein N is larger than one,
   the first UCI is included in the PUSCH over one slot, and
   a number of resource elements for the first UCI in the PUSCH is proportional to N.

* * * * *